(12) United States Patent
Wu et al.

(10) Patent No.: US 12,392,660 B1
(45) Date of Patent: Aug. 19, 2025

(54) CURVE-BASED RADIOMETRIC CALIBRATION METHOD AND SYSTEM OF SPACEBORNE HYPERSPECTRAL IMAGER

(71) Applicant: WUHAN UNIVERSITY, Hubei (CN)

(72) Inventors: Zhaocong Wu, Hubei (CN); Keyi Rao, Hubei (CN); Siqing Zhang, Hubei (CN); Shaoju Wang, Hubei (CN); Weixing Xu, Hubei (CN); Nan Xie, Hubei (CN)

(73) Assignee: WUHAN UNIVERSITY, Hubei (CN)

( * ) Notice: Subject to any disclaimer, the term of this patent is extended or adjusted under 35 U.S.C. 154(b) by 0 days.

(21) Appl. No.: 19/198,111

(22) Filed: May 4, 2025

(30) Foreign Application Priority Data

May 8, 2024 (CN) .......................... 202410558776.9

(51) Int. Cl.
*G01J 3/02* (2006.01)
*G01J 3/28* (2006.01)

(52) U.S. Cl.
CPC .......... *G01J 3/0297* (2013.01); *G01J 3/2823* (2013.01); *G01J 2003/2826* (2013.01); *G01J 2003/2879* (2013.01)

(58) Field of Classification Search
CPC .......... G01J 3/0297; G01J 3/0294; G01J 3/28; G01J 3/2823; G01J 2003/2826; G01J 2003/2879
See application file for complete search history.

(56) References Cited

U.S. PATENT DOCUMENTS 5,790,188 A * 8/1998 Sun ...................... G01J 3/2823
348/143
2016/0123811 A1* 5/2016 Hegyi ................... G01J 3/0224
348/33

(Continued)

FOREIGN PATENT DOCUMENTS

CN 109724698 5/2019

OTHER PUBLICATIONS

Fu; Liping et al., "Research Progress on On-Orbit Calibration Technology for Far Ultraviolet Payload", Spectroscopy and Spectral Analysis, Dec. 2019, with English translation thereof, pp. 1-16, vol. 39, Issue 12.

(Continued)

*Primary Examiner* — Abdullahi Nur
(74) *Attorney, Agent, or Firm* — JCIP GLOBAL INC.

(57) ABSTRACT

The present disclosure provides a curve-based radiometric calibration method and system of a spaceborne hyperspectral imager, which belongs to the field of remote-sensing optical technologies. A new radiometric calibration coefficient curve is introduced to describe the radiometric properties of sensor response, providing the radiometric calibration coefficients of all bands of the hyperspectral camera with linear variable filter (LVF) within an imaging spectral range to match the implementation of the programmable band selection imaging technology, and thereby efficiently and simply implementing single-band imaging, integral imaging of adjacent band, imaging of randomly-selected band combination and within-spectral-range cyclic imaging. In the present disclosure, the radiometric calibration coefficient is used to cover the entire imaging spectral range of the hyperspectral camera and match the implementation of the programmable band selection imaging technology, and (Continued)

realizing on-orbit absolute radiometric calibration with simple flow and strong universality.

10 Claims, 14 Drawing Sheets

(56) References Cited

U.S. PATENT DOCUMENTS

2018/0095307 A1* 4/2018 Herloski ............ G03G 15/5062
2021/0383573 A1* 12/2021 Holt ........................ G01S 7/497

OTHER PUBLICATIONS

Wang; Jianwei et al., "Fast Spectral Calibration Method of Spectral Imager", Spectroscopy and Spectral Analysis, Jul. 2022, with English translation thereof, pp. 1-10, vol. 42, Issue 7.
Xiujuan Yu et al., "Laboratory Spectral Calibration and Radiometric Calibration of Hyper-spectral Imaging Spectrometer", 2014 2nd International Conference on Systems and Informatics (ICSAI 2014), Jan. 31, 2015, pp. 1-5.
"Search Report of China Counterpart Application", with English translation thereof, p. 1-p. 6.

* cited by examiner

CURVE-BASED RADIOMETRIC CALIBRATION METHOD AND SYSTEM OF SPACEBORNE HYPERSPECTRAL IMAGER

CROSS REFERENCE TO RELATED APPLICATION

This application claims the priority benefit of China patent application serial no. 202410558776.9 filed May 8, 2024. The entirety of each of the above-mentioned patent applications is hereby incorporated by reference herein and made a part of the specification.

TECHNICAL FIELD

The present disclosure relates to the field of remote-sensing optical technologies, and in particular to a curve-based radiometric calibration method and system of a spaceborne hyperspectral imager.

BACKGROUND

The hyperspectral imager is an advanced detection device integrating spectral acquisition and target imaging. A linear variable filter is an optical device with its spectral properties linearly changing along with mechanical position, which can decompose incident polychromatic light into spectra corresponding to positions, so as to realize continuous and accurate narrow-band spectrum acquisition. Compared with conventional prisms and grating spectral imagers, the hyperspectral imagers with linear variable filter have the characteristics of compact optical paths, high integration degree, strong anti-vibration capability and pushbroom imaging and the like, featuring entire compact structure, high flexibility, small volume and light weight, and realizing efficient spectral acquisition in limited hardware space and thereby being applicable to on-orbit deployment of nano satellites.

With the linear variable filter (LVF) serving as a light splitter to combine with a Complementary Metal Oxide Semiconductor (CMOS) detector array, data of any imaging row can be read. Based on the above principle, LVF-based hyperspectral imager has the function of quickly selecting any wavelength in real time for scan imaging and can implement single-band imaging, integral imaging of adjacent band, imaging of randomly-selected band combination and within-spectral-range cyclic imaging, and the spectral resolution can be adjustable based on wavelength. Since different ground objects have different sensitivities to different wavelengths, a band with typical target properties is selected purposely for imaging, reducing the redundancy of the hyperspectral data and highlighting target characteristics.

Although the programmable band selection imaging technology brings new potential to the hyperspectral imaging, a new challenge is also brought to the radiometric correction of the sensor response properties. The sensor correction is a process in which a radiometric correction coefficient is measured. The coefficient is used to convert an image brightness value (gray value) obtained by the sensor into a corresponding physical variable, i.e. a spectral radiance at the entrance pupil of the sensor. For matching the implementation of the programmable band selection imaging technology, the sensor correction is required to measure up to one thousand radiometric correction coefficients corresponding to nearly continuous narrow bands. However, full-spectrum hyperspectral imaging systems generate hundreds of redundant bands with high inter-band correlation, imposing severe burdens on data transmission, storage, and pre-processing. These challenges are further amplified in radiometric calibration, where traditional per-band measurement methods become prohibitively resource-intensive for spaceborne systems.

SUMMARY

The present disclosure provides a Curve-based Hyperspectral Imager Radiometric Calibration method (CHIRON) method and system of a spaceborne hyperspectral imager to address the defects in the prior arts.

According to a first aspect, the present disclosure provides a curve-based radiometric calibration method of a spaceborne hyperspectral imager, which includes:
  before a to-be-determined hyperspectral imager is launched, matching a LVF with a CMOS detector array to acquire a matching result of a CMOS detector row number;
  in a laboratory dark background environment, performing no-reference radiation source imaging and calibration light source imaging of the to-be-determined hyperspectral imager, and completing additive noise correction and non-uniformity correction of the CMOS detector;
  based on the calibration source light imaging and measured spectral radiance distribution, measuring a radiometric calibration coefficient reference value of several conventional spectral channels;
  based on the radiometric calibration coefficient reference value, establishing a prelaunch radiometric calibration coefficient curve equation, and determining a radiometric calibration curve accuracy evaluation result;
  after the to-be-determined hyperspectral imager is launched, establishing a radiometric reference transmission link;
  with the constraints of spatial, spectral, and temporal resolutions, completing system-level preprocessing of the to-be-determined hyperspectral imager and measuring the radiometric calibration coefficient reference value of the to-be-determined hyperspectral imager on orbit;
  based on the radiometric calibration curve accuracy evaluation result, performing fitting on data points of the radiometric calibration coefficient reference value by using fitting algorithm and establishing a postlaunch radiometric calibration coefficient curve equation;
  based on the postlaunch radiometric calibration coefficient curve equation, performing periodic calculation on the radiometric calibration coefficient reference value of the to-be-determined hyperspectral imager on orbit to obtain an updated on-orbit attenuated radiometric calibration curve, and obtaining an imaging band radiometric calibration coefficient based on the updated on-orbit attenuated radiometric calibration curve.

In the curve-based radiometric calibration method of the spaceborne hyperspectral imager provided by the present disclosure, before the to-be-determined hyperspectral imager is launched, matching the LVF with the CMOS detector array to acquire the matching result of the CMOS detector row number includes the following steps:
  at step 1.1, with a monochromator as a wavelength-continuously-adjustable light source irradiating the to-be-determined hyperspectral imager through a collimator, the monochromator, with a minimum step distance as a start of wavelength change, repetitively outputs actual stepping corresponding to each standard wavelength by starting from a start wavelength of the to-be-determined hyperspectral imager, and collects calibration images of different wavelengths output by the to-be-determined hyperspectral imager until an ending wavelength of the to-be-determined hyperspectral imager is reached;

at step 1.2, a mean gray value of an image with a central wavelength of λc is calculated row-by-row and a row with a maximum mean gray value is used as a corresponding output row j of the central wavelength λe;

at step 1.3, the step 1.2 is repeated within an imaging spectral range to obtain evenly spaced central wavelengths and their corresponding output rows. Establish the relationship between central wavelengths within the monochromator's measurable spectral range and step increments, and their associated row numbers on an LVF-based hyperspectral imager.

at step 1.4, based on least square method, a linear relational expression $\lambda_c(j)=g \times j+w_0$ between CMOS detector row number and central wavelength is established, where g is a wavelength change gradient of the LVF, and $w_0$ is a wavelength corresponding to a start mechanical position of the LVF.

In the curve-based radiometric calibration method of the spaceborne hyperspectral imager provided by the present disclosure, in the laboratory dark background environment, performing no-reference radiation source imaging and calibration light source imaging of the to-be-determined hyperspectral imager, and completing additive noise correction and non-uniformity correction of the CMOS detector include the following steps:

at step 2.1, the to-be-determined hyperspectral imager is enabled to work in a dark background imaging mode to collect dark background image data several times;

at step 2.2, the to-be-determined hyperspectral imager is set to default imaging parameters, the to-be-determined hyperspectral imager is irradiated with a integrating sphere to collect valid image data several times, and a spectral radiance distribution of the integrating sphere is measured with a spectroradiometer;

at step 2.3, the spectral radiance distribution of the integrating sphere is continuously and uniformly changed several times and the step 2.2 is repeated;

at step 2.4, based on the collected calibration images and the spectral radiance distribution output by the integrating sphere, a relative radiometric calibration coefficient and a relative response non-linearity of the to-be-determined hyperspectral imager are calculated:

$$\overline{DN_{i,k}}-\overline{DN_{i,0}}=(DN_{i,j,k}-DN_{i,j,0})*a_{i,j}+b_{i,j}$$

where $\overline{DN_{i,k}}$ is an output signal mean value of the i-th row of valid detector elements under the k-th-level radiance, $\overline{DN_{i,0}}$ is an output signal mean value of the i-th row of valid detector elements at the time of no-reference radiation source, $DN_{i,j,k}$ is an output signal mean value of the picture element of the i-th row and the j-th column under the k-th-level radiance, $DN_{i,j,0}$ is an output signal of the picture element of the i-th row and the j-th column at the time of no-reference radiation source, $a_{i,j}$, $b_{i,j}$ are a relative radiometric calibration coefficient and a relative radiometric calibration constant of the j-th detector element of the i-th band.

In the curve-based radiometric calibration method of the spaceborne hyperspectral imager provided by the present disclosure, based on the calibration source light imaging and the measured spectral radiance distribution, measuring the radiometric calibration coefficient reference value of several conventional spectral channels includes the following steps:

At step 3.1, based on the collected calibration images and the spectral radiance distribution output by the integrating sphere, an absolute radiometric calibration coefficient of each spectral channel is calculated, and the calculation of an equivalent radiance of the to-be-determined hyperspectral imager corresponding to the spectral radiance distribution output by the integrating sphere includes the following steps:

$$L_e = \frac{\int_{\lambda_{min}}^{\lambda_{max}} L_\lambda R_\lambda d\lambda}{\int_{\lambda_{min}}^{\lambda_{max}} R_\lambda d\lambda}$$

where $L_e$ is an equivalent radiance of a current spectral channel, $R_\lambda$ is a relative spectral response function of the current spectral channel, $\lambda_{min}$ is a minimum wavelength of the relative spectral response function, $\lambda_{max}$ is a maximum wavelength of the relative spectral response function, and $L_\lambda$ is a spectral radiance distribution output by the integrating sphere;

at step 3.2, an output row j corresponding to the central wavelength $\lambda_c$ of the current spectral channel is selected on the current calibration image, and a mean gray value $\langle L_j \rangle$ of all pixels on the row j is calculated;

at step 3.3, the calibration images corresponding to different spectral radiance distributions are selected to repeat the step 3.2 so as to obtain corresponding mean gray values; through relative radiometric correction and additive noise elimination, the formula $L_\lambda=G_\lambda \cdot (L_j)$ can be obtained, where $L_\lambda$ is a spectral radiance distribution output by the integrating sphere, $\langle L_j \rangle$ is a mean gray value of all pixels on the j-th row of a camera detector, and $G_\lambda$ is a radiometric calibration coefficient reference value; by least square fitting, the radiometric calibration coefficient of any spectral channel is calculated;

at step 3.4, the calibration images of different spectral channels are selected to repeat the step 3.3 so as to obtain the radiometric calibration coefficients of several conventional spectral channels as the radiometric calibration coefficient reference value.

In the curve-based radiometric calibration method of the spaceborne hyperspectral imager provided by the present disclosure, based on the radiometric calibration coefficient reference value, establishing the prelaunch radiometric calibration coefficient curve equation and determining the radiometric calibration curve accuracy evaluation result include the following steps:

at step 4.1, based on the linear relational expression $\lambda_c(j)=g \times j+w_0$ between CMOS detector row number and central wavelength and the radiometric calibration coefficient reference value $G_\lambda$, regression analysis is performed on multiple groups of data points to obtain a curve equation of radiometric calibration coefficient reference value $G_\lambda=F(j)$, where $G_\lambda$ is a radiometric calibration coefficient reference value, j is a detector array row number, and F is a radiometric calibration coefficient curve equation;

at step 4.2, $$R^2 = 1 - \frac{\sum_{\lambda=1}^{n}(M_\lambda - F_\lambda)^2}{\sum_{\lambda=1}^{n}(M_\lambda - \overline{M})^2}$$

is determined as the radiometric calibration curve accuracy evaluation result, where $F_\lambda$ is a fitting value with the band central wavelength being $\lambda$, $M_\lambda$ is a measurement reference value with the band central wavelength being $\lambda$, n is a total wavelength number, $R^2$ is a determination coefficient, and $\overline{M}$ is a measurement reference mean value with the band central wavelength being A;

At step 4.3, based on the radiometric calibration curve accuracy evaluation result, a polynomial function is used as the prelaunch radiometric calibration coefficient curve equation:

$$G_\lambda = p_1\lambda_j^n + p_2\lambda_j^{n-1} + \ldots + p_n\lambda_j + p_{n+1}$$

where n is a degree of a polynomial, namely, a total wavelength number, and $p_1, p_2 \ldots, p_{n+1}$ are coefficients of the degrees of the corresponding items of the polynomial.

In the curve-based radiometric calibration method of the spaceborne hyperspectral imager provided by the present disclosure, after the to-be-determined hyperspectral imager is launched, establishing the radiometric reference transmission link includes the following steps:

at step 5.1, integration is performed on reference Top-of-Atmosphere (TOA) reflectance data $\rho_{TOA}(\lambda)$ based on spectral integration formula to obtain a mean TOA reflectance $\langle \rho_{TOA}(\lambda) \rangle$ corresponding to the central wavelength A of the to-be-determined hyperspectral imager:

$$\langle \rho_{TOA}(\lambda) \rangle = \frac{\int_{\lambda \in B} \rho_{TOA}(\lambda) S_B(\lambda) d\lambda}{\int_{\lambda \in B} S_B(\lambda) d\lambda}$$

where $\langle \rho_{TOA}(\lambda) \rangle$ is a mean TOA reflectance corresponding to the central wavelength $\lambda$ of the to-be-determined hyperspectral imager, $\rho_{TOA}(\lambda)$ is reference TOA reflectance data, and B and $S_B$ are a spectral range and a spectral response function of the to-be-determined hyperspectral imager respectively;

At step 5.2, based on geometrical conditions of earth observation, the equivalent radiance $\overline{DN_\lambda}$ of each spectral band at the entrance pupil of the to-be-determined hyperspectral imager is obtained, and a radiometric reference transmission link equation includes:

$$\overline{DN_\lambda} = \frac{\langle \rho_{TOA}(\lambda) \rangle \times E_{sun}(\lambda) \times \cos(\theta_{SAT})}{\pi \times D_{SE}^2}$$

where $\overline{DN_\lambda}$ is an equivalent radiance of each spectral band at the entrance pupil of the to-be-determined hyperspectral imager, which is in the unit of w/(m² sr μm); $\langle \rho_{TOA}(\lambda) \rangle$ is a mean TOA reflectance corresponding to the central wavelength $\lambda$ of the to-be-determined hyperspectral imager, which has no unit dimension; $D_{SE}$ is an earth-sun distance represented by astronomical unit (AU); $E_{sun}(\lambda)$ is a solar spectral irradiance of a position corresponding to the central wavelength $\lambda$ of the to-be-determined hyperspectral imager at the time of satellite imaging; and $\theta_{SAT}$ is a solar zenith angle at the time of satellite imaging.

In the curve-based radiometric calibration method of the spaceborne hyperspectral imager provided by the present disclosure, with the constraints of spatial, spectral and temporal resolutions, completing system-level preprocessing of the to-be-determined hyperspectral imager and measuring the radiometric calibration coefficient reference value of the to-be-determined hyperspectral imager on orbit include the following steps:

at step 6.1, the mean gray value $\langle L_\lambda \rangle$ of each band of representative pixel points is calculated:

$$\langle L_\lambda \rangle = \frac{\langle L_\lambda \rangle_{total}}{MN}$$

where M and N are a row and a column of representative pixels respectively, with the total number being MN; $\langle L_\lambda \rangle_{total}$ is a total gray value of each band $\lambda$ obtained by traversing representative picture elements of each band, and $\langle L_j \rangle$ is a mean gray value of each band of representative pixel points;

at step 6.2, based on the constraints of spatial, spectral and temporal resolutions, the radiometric calibration coefficient reference value is obtained by least square fitting:

$$\langle L_\lambda \rangle = G_\lambda \times \langle L\lambda \rangle$$

where $\langle \overline{L\lambda} \rangle$ is a weighted mean gray value corresponding to the band central wavelength $\lambda$, $\langle L_\lambda \rangle$ is a mean gray value of each band of representative pixel points corresponding to the band central wavelength $\lambda$, and $G_\lambda$ is a radiometric calibration coefficient reference value.

In the curve-based radiometric calibration method of the spaceborne hyperspectral imager provided by the present disclosure, based on the radiometric calibration curve accuracy evaluation result, performing fitting on the data points of the radiometric calibration coefficient reference value by fitting and establishing the postlaunch radiometric calibration coefficient curve equation include the following steps:

at step 7.1, based on the radiometric calibration curve accuracy evaluation result, a cubic polynomial function is used as the postlaunch radiometric calibration coefficient curve equation:

$$G_\lambda = p_1\lambda_j^3 + p_2\lambda_j^{n-1} + p_3\lambda_j + p_4$$

where $G_\lambda$ is a radiometric calibration coefficient reference value, j is a detector array row number, and $p_1, p_2, p_3, p_4$ are coefficients of the degrees of the corresponding items of the polynomial;

at step 7.2, the coefficient of each item of the postlaunch radiometric calibration coefficient curve equation is calculated by the least square method, and the postlaunch radiometric calibration coefficient curve equation is solved;

at step 7.3, the root-mean-square error $$RMSE = \sqrt{\frac{1}{n}\sum_{j=1}^{n}(M_\lambda - F_\lambda)^2}$$

is used as curve accuracy evaluation formula, where $F_\lambda$ is a fitting value of the band central wavelength $\lambda$, $M_\lambda$ is a measurement reference value of the band central wavelength λ, n is a total wavelength number and j is a detector array row number.

In the curve-based radiometric calibration method of the spaceborne hyperspectral imager provided by the present disclosure, based on the postlaunch radiometric calibration coefficient curve equation, performing periodic calculation on the radiometric calibration coefficient reference value of the to-be-determined hyperspectral imager on orbit to obtain an updated on-orbit attenuated radiometric calibration curve includes the following step:

based on the linear relational expression $\lambda_c(j)=g \times j+w_0$ between CMOS detector row number and central wavelength and the postlaunch radiometric calibration coefficient curve equation, periodic calculation is performed on the radiometric calibration coefficient reference value of the to-be-determined hyperspectral imager on orbit to obtain an updated on-orbit attenuated radiometric calibration curve.

According to a second aspect, the present disclosure further provides a curve-based radiometric calibration system of a spaceborne hyperspectral imager, which includes:

- a matching module, configured to, before a to-be-determined hyperspectral imager is launched, match a LVF with a CMOS detector array to acquire a matching result of a CMOS detector row number;
- a correcting module, configured to, in a laboratory dark background environment, perform no-reference radiation source imaging and calibration light source imaging of the to-be-determined hyperspectral imager, and complete additive noise correction and non-uniformity correction of the CMOS detector;
- a measuring module, configured to, based on the calibration source light imaging and measured spectral radiance distribution, measure a radiometric calibration coefficient reference value of several conventional spectral channels;
- a first establishing module, configured to, based on the radiometric calibration coefficient reference value, establish a prelaunch radiometric calibration coefficient curve equation and determine a radiometric calibration curve accuracy evaluation result;
- a second establishing module, configured to, after the to-be-determined hyperspectral imager is launched, establish a radiometric reference transmission link;
- a constraining module, configured to, with the constraints of spatial, spectral and temporal resolutions, complete system-level preprocessing of the to-be-determined hyperspectral imager and measure the radiometric calibration coefficient reference value of the to-be-determined hyperspectral imager on orbit;
- a third establishing module, configured to, based on the radiometric calibration curve accuracy evaluation result, perform fitting on data points of the radiometric calibration coefficient reference value by fitting and establish a postlaunch radiometric calibration coefficient curve equation;
- an updating module, configured to, based on the postlaunch radiometric calibration coefficient curve equation, perform periodic calculation on the radiometric calibration coefficient reference value of the to-be-determined hyperspectral imager on orbit to obtain an updated on-orbit attenuated radiometric calibration curve, and obtain an imaging band radiometric calibration coefficient based on the updated on-orbit attenuated radiometric calibration curve.

In the curve-based radiometric calibration method and system of the spaceborne hyperspectral imager, the radiometric calibration coefficient is used to cover the entire imaging spectral range of the hyperspectral imager and match the implementation of the programmable band selection imaging technology, realizing on-orbit absolute radiometric calibration with simple flow and strong universality, greatly reducing the satellite resources required for the on-orbit radiometric calibration of the spaceborne LVF-based hyperspectral imager, and thus providing important reference for normalized and periodic on-orbit radiometric calibration.

BRIEF DESCRIPTIONS OF THE DRAWINGS

In order to more clearly describe the technical solutions in the present disclosure or in the prior arts, brief introduction will be made to the drawings required for description of the embodiments or the prior arts. Obviously, the drawings described hereunder are only some embodiments of the present disclosure. Those skilled in the arts can also obtain other drawings based on these drawings without carrying out creative work.

Figure 8A:
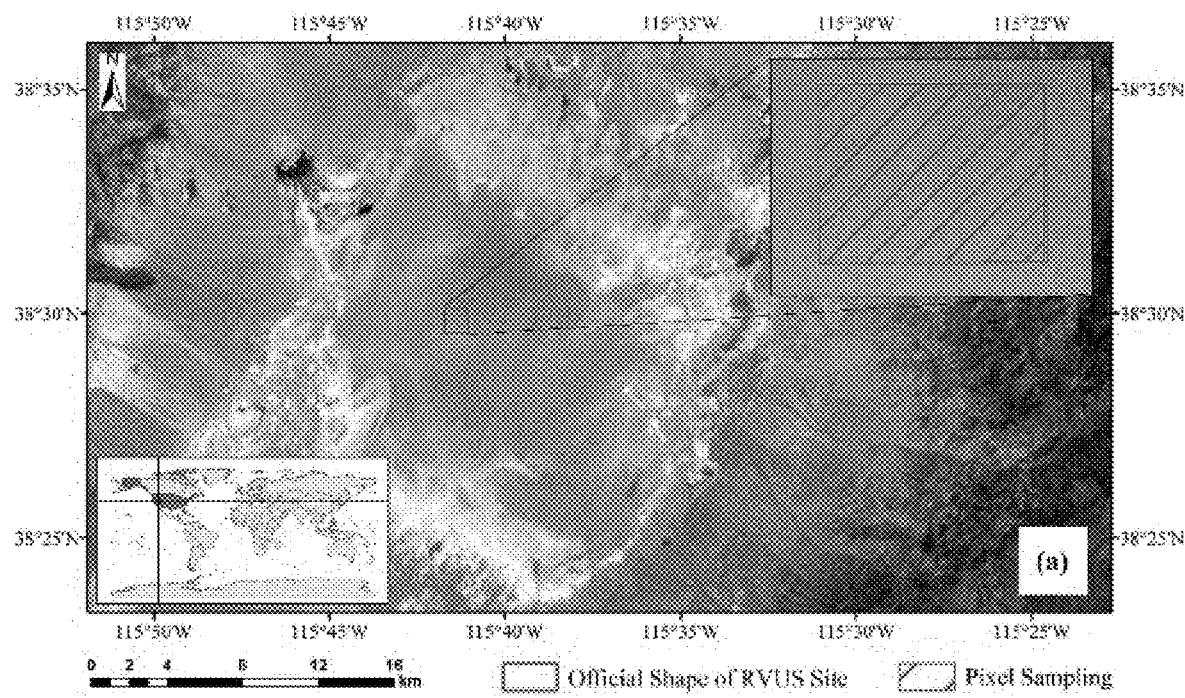
Figure 8B:
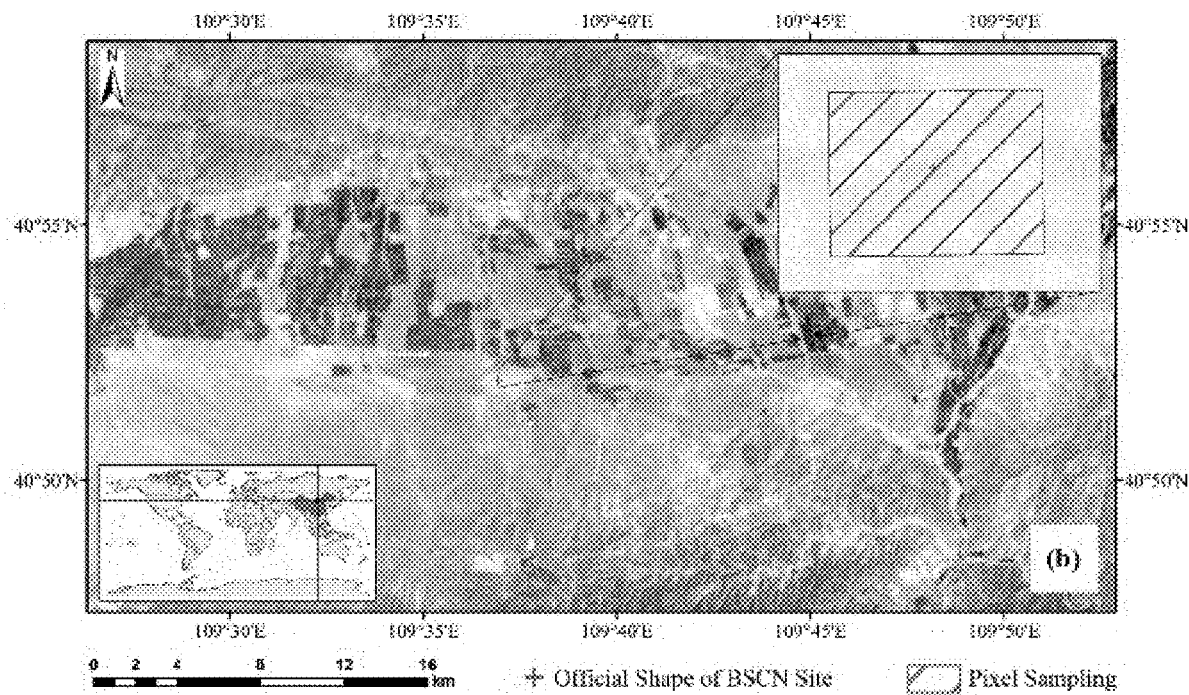
Figure 8C:
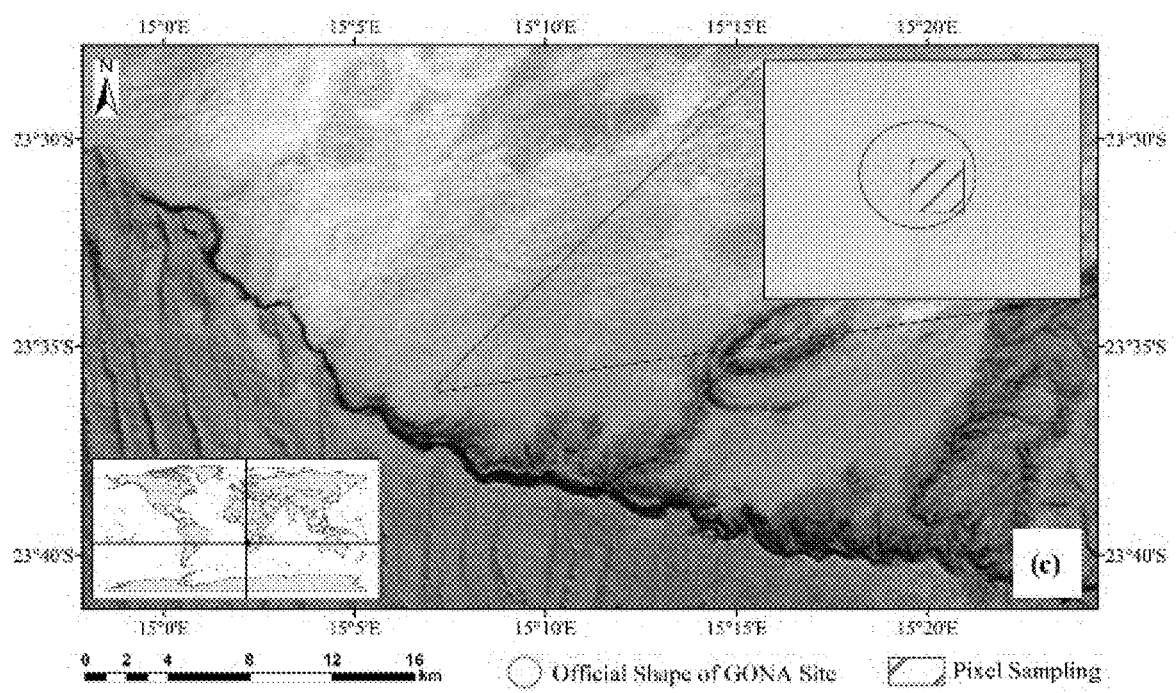
Figure 8D:
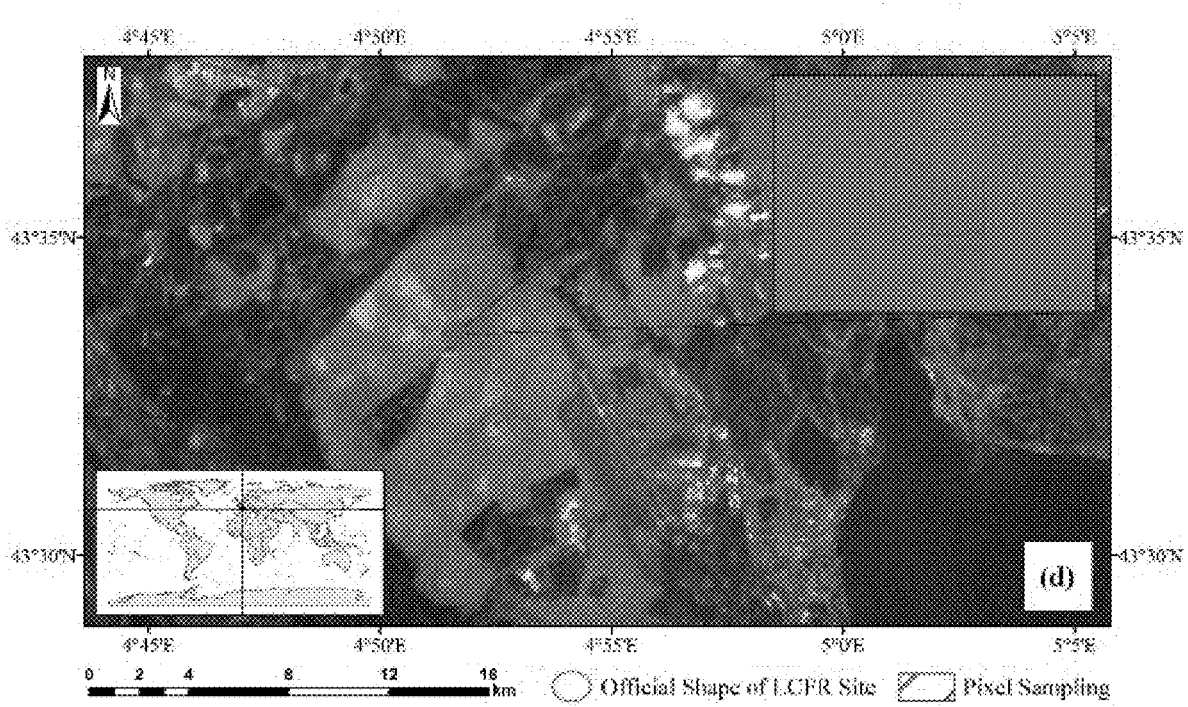
Figure 9A:
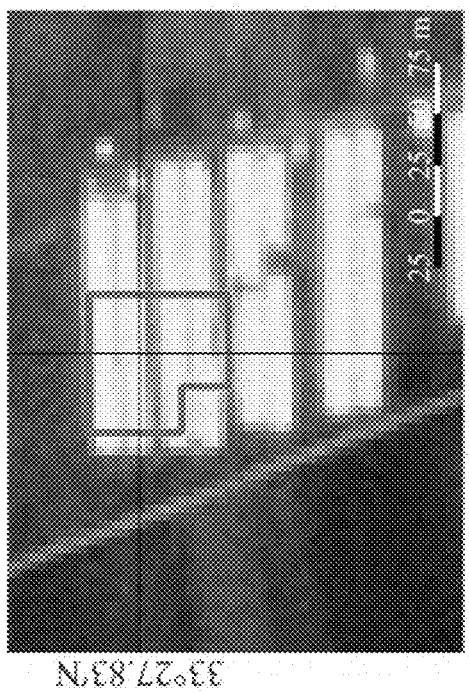
Figure 9B:
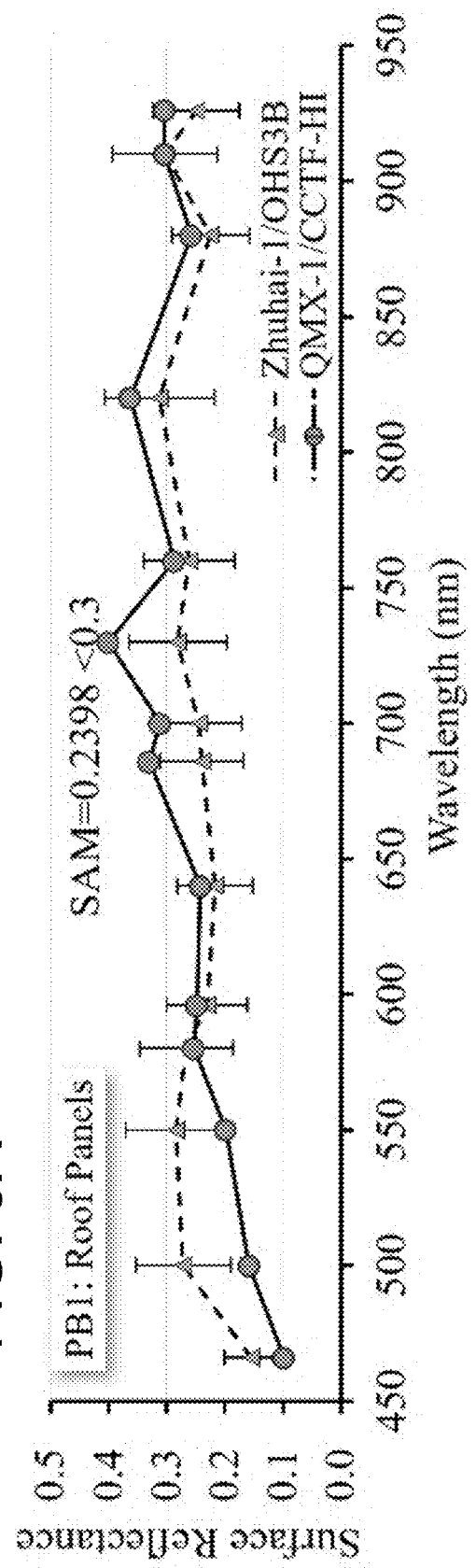
Figure 9C:
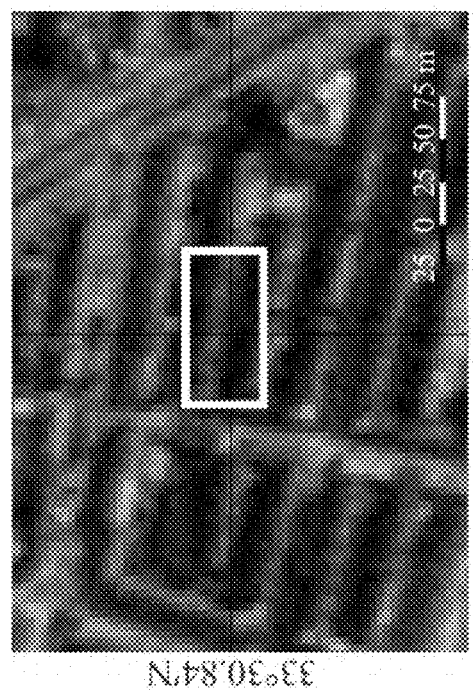
Figure 9D:
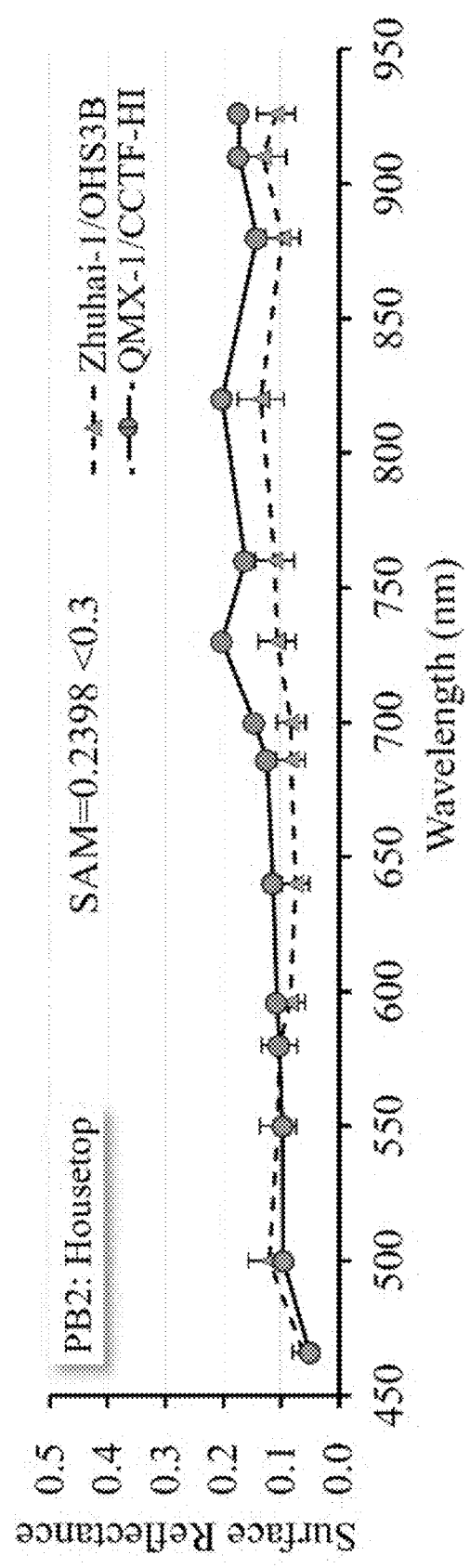
Figure 9E:
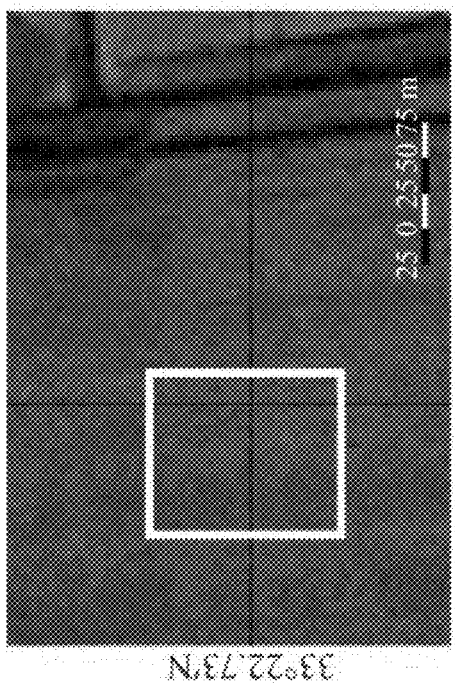
Figure 9F:
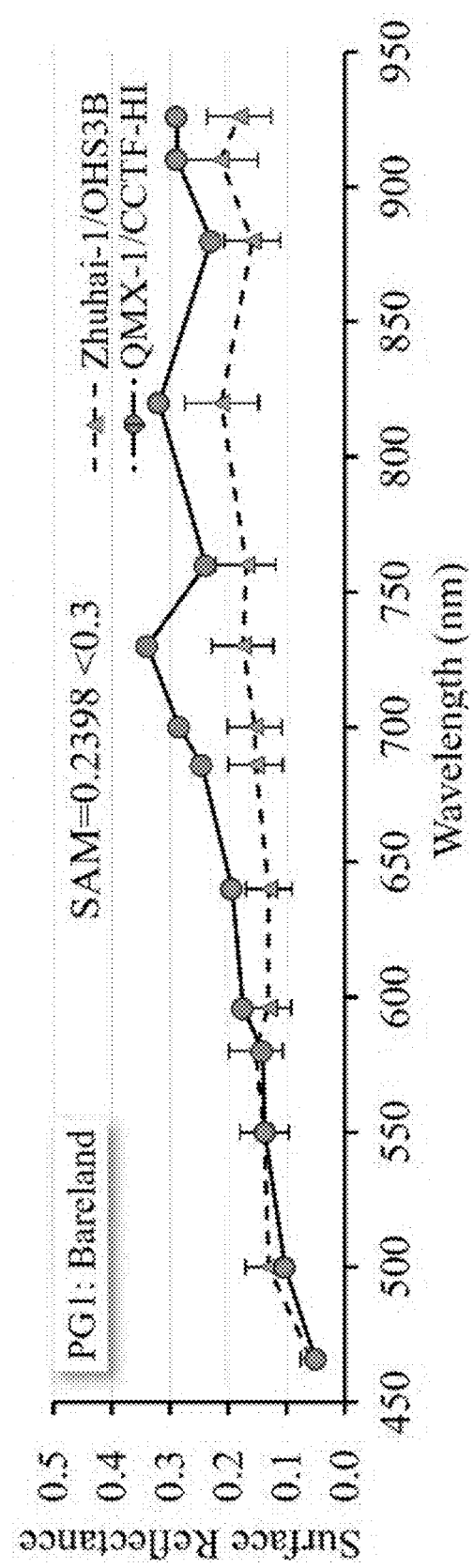
Figure 9G:
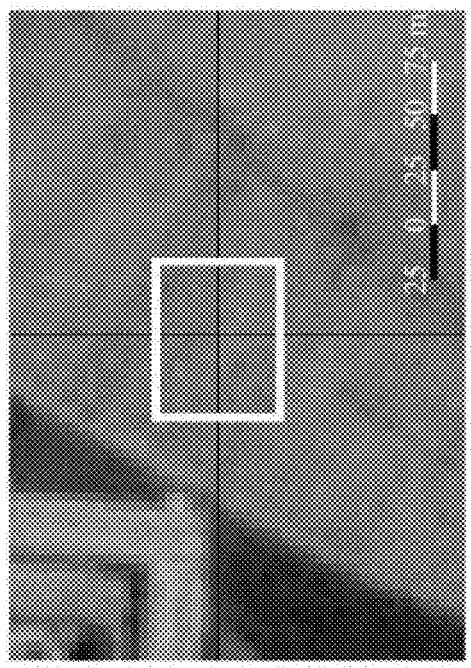
Figure 9H:
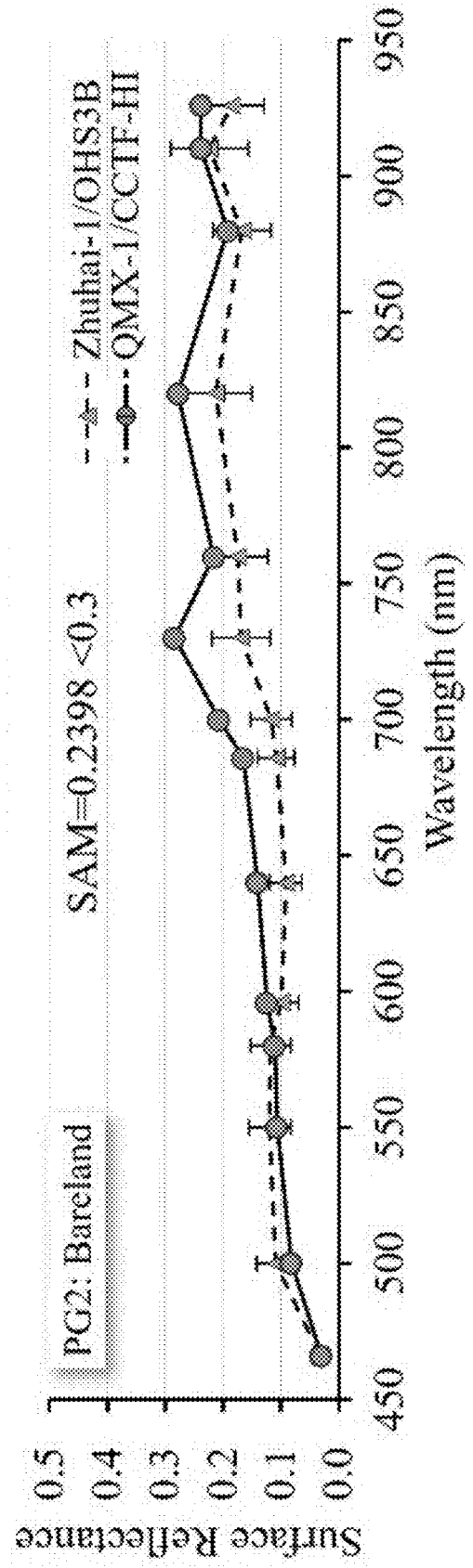
Figure 9I:
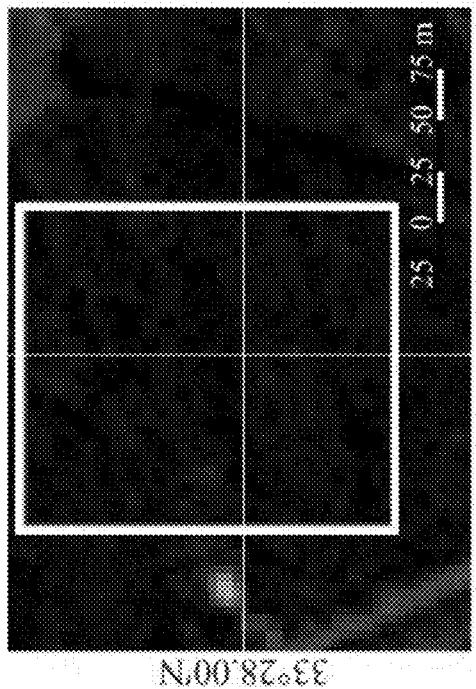
Figure 9J:
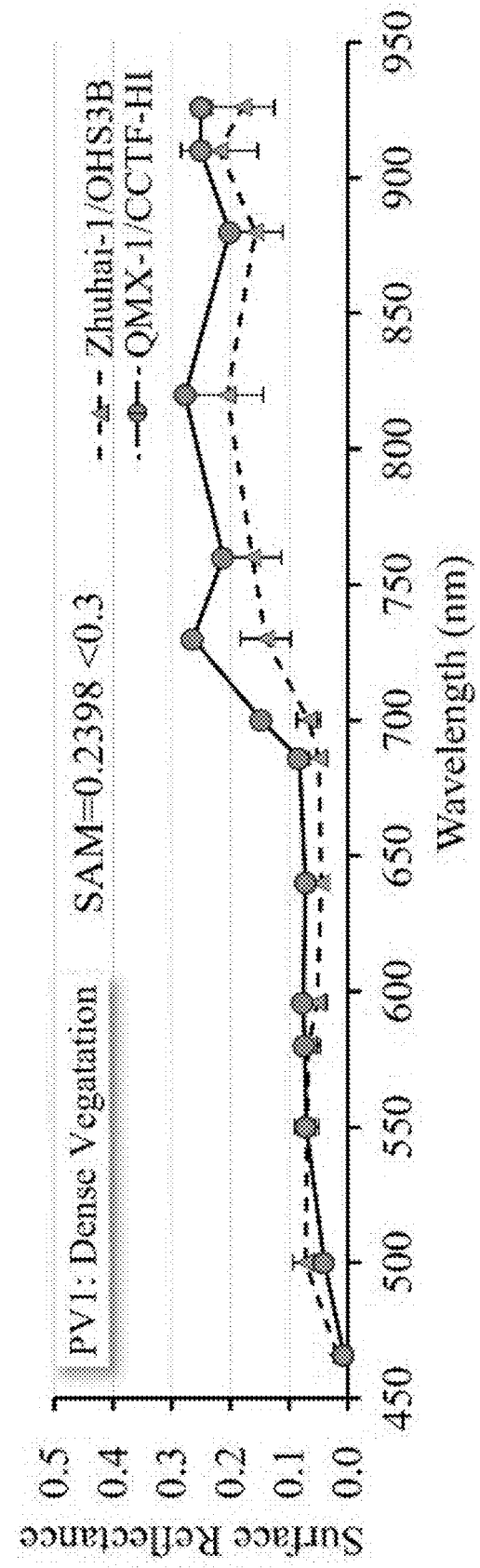
Figure 9K:
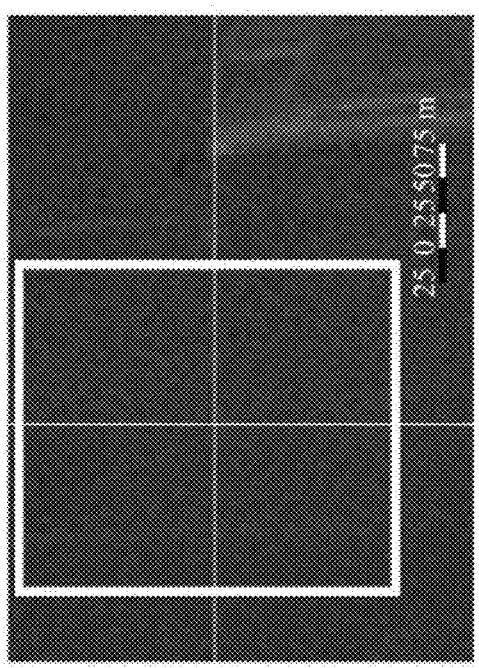
Figure 9L:
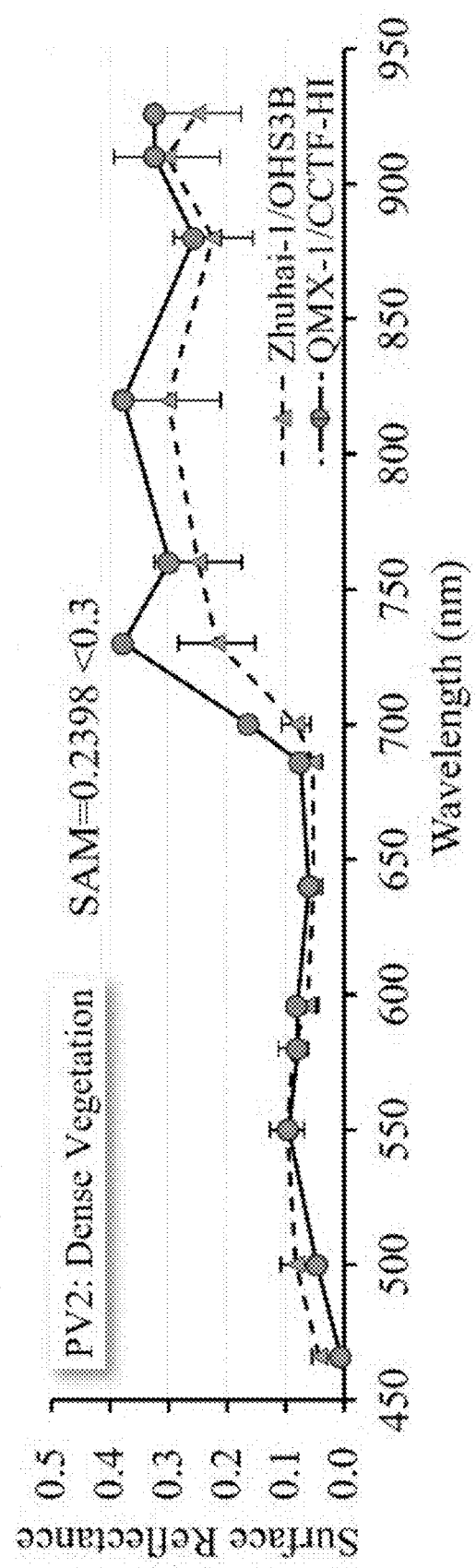

FIGS. 8A to 8D are schematic diagrams illustrating the geographic location and spatial distribution of four RadCal-Net sites and their spatial sampling for on-orbit radiometric calibration of QMX-1/CCTF-HI. FIG. 8A: RVUS site. FIG. 8B: BSCN site. FIG. 8C: GONA site. FIG. 8D: LCFR site.

FIG. 9A to FIG. 9L are schematic diagrams comparing the bottom-of-atmosphere reflectance measurements of QMX-1/CCTF-HI and Zhuhai-1/OHS3B satellites.

DETAILED DESCRIPTIONS OF EMBODIMENTS

In order to make the objects, technical solutions and advantages of the embodiments of the present disclosure clearer, the technical solutions of the embodiments of the present disclosure will be fully and clearly described below in combination with the accompanying drawings in the embodiments of the present disclosure. Apparently, the embodiments described herein are merely some embodiments of the present disclosure rather than all embodiments. Other embodiments obtained by those skilled in the art based on these embodiments without making creative work shall all fall within the scope of protection of the present disclosure.

For the shortcomings in the prior arts, the present disclosure creatively introduces, based on the theoretical basis of linear change of the spectral properties of the linear variable filter along with mechanical position, a new radiometric calibration coefficient curve to describe radiometric properties of the sensor response as periodic on-orbit radiometric calibration observation parameters of the hyperspectral imager with linear variable filter.

Figure 1:
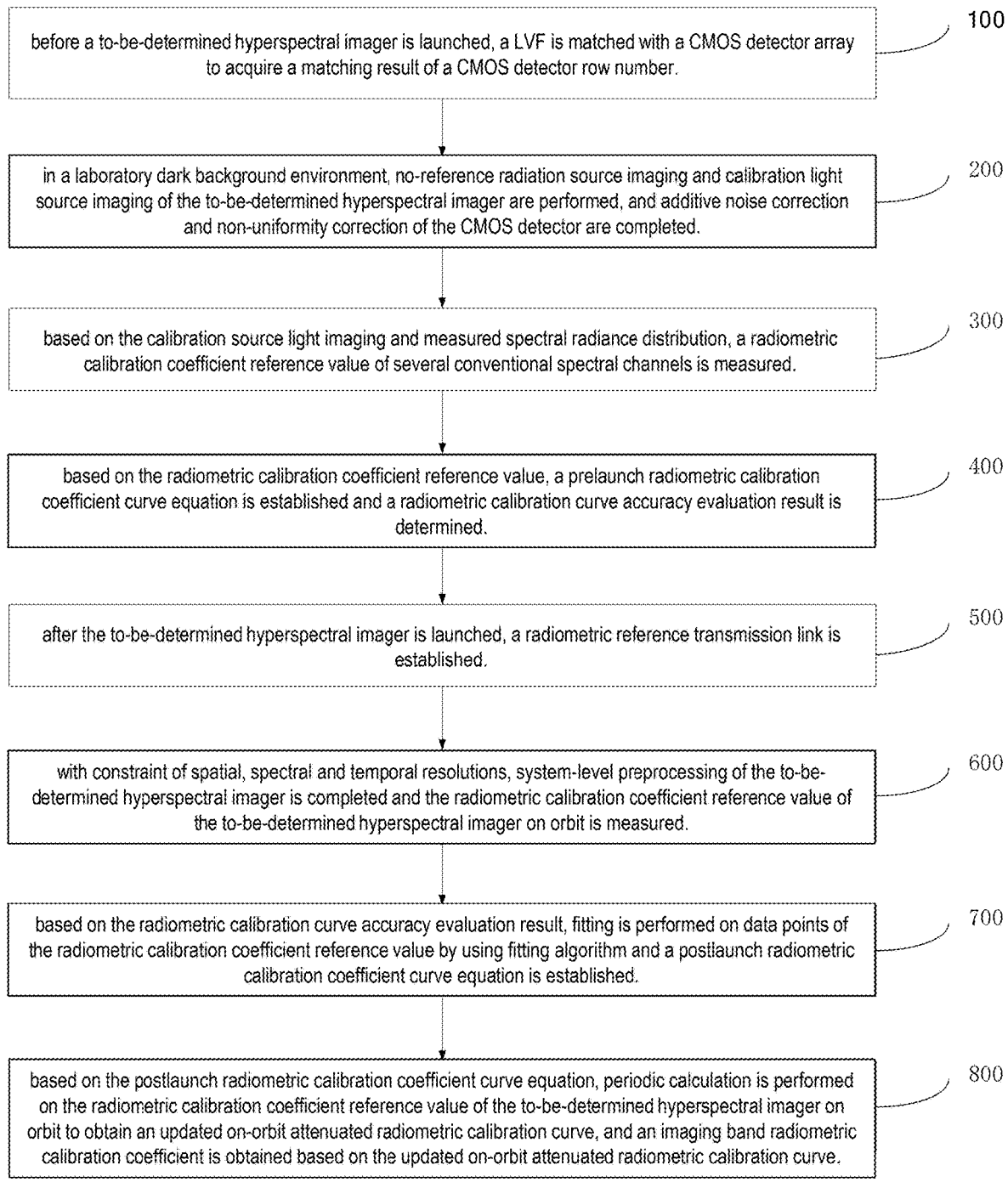
FIG. 1 is a flowchart 1 illustrating a curve-based radiometric calibration method of a spaceborne hyperspectral imager according to the present disclosure.

FIG. 1 is a flowchart 1 illustrating a curve-based radiometric calibration method of a spaceborne hyperspectral imager according to the present disclosure. As shown in FIG. 1, the method includes the following steps.

At step 100, before a to-be-determined hyperspectral imager is launched, an LVF is matched with a CMOS detector array to acquire a matching result of a CMOS detector row number.

At step 200, in a laboratory dark background environment, no-reference radiation source imaging and calibration light source imaging of the to-be-determined hyperspectral imager are performed, and additive noise correction and non-uniformity correction of the CMOS detector are completed.

At step 300, based on the calibration source light imaging and measured spectral radiance distribution, a radiometric calibration coefficient reference value of several conventional spectral channels is measured.

At step 400, based on the radiometric calibration coefficient reference value, a prelaunch radiometric calibration coefficient curve equation is established and a radiometric calibration curve accuracy evaluation result is determined.

At step 500, after the to-be-determined hyperspectral imager is launched, a radiometric reference transmission link is established.

At step 600, with the constraints of spatial, spectral and temporal resolutions, system-level preprocessing of the to-be-determined hyperspectral imager is completed and the radiometric calibration coefficient reference value of the to-be-determined hyperspectral imager on orbit is measured.

At step 700, based on the radiometric calibration curve accuracy evaluation result, fitting is performed on data points of the radiometric calibration coefficient reference value by fitting and a postlaunch radiometric calibration coefficient curve equation is established.

At step 800, based on the postlaunch radiometric calibration coefficient curve equation, periodic calculation is performed on the radiometric calibration coefficient reference value of the to-be-determined hyperspectral imager on orbit to obtain an updated on-orbit attenuated radiometric calibration curve, and an imaging band radiometric calibration coefficient is obtained based on the updated on-orbit attenuated radiometric calibration curve.

Figure 2:
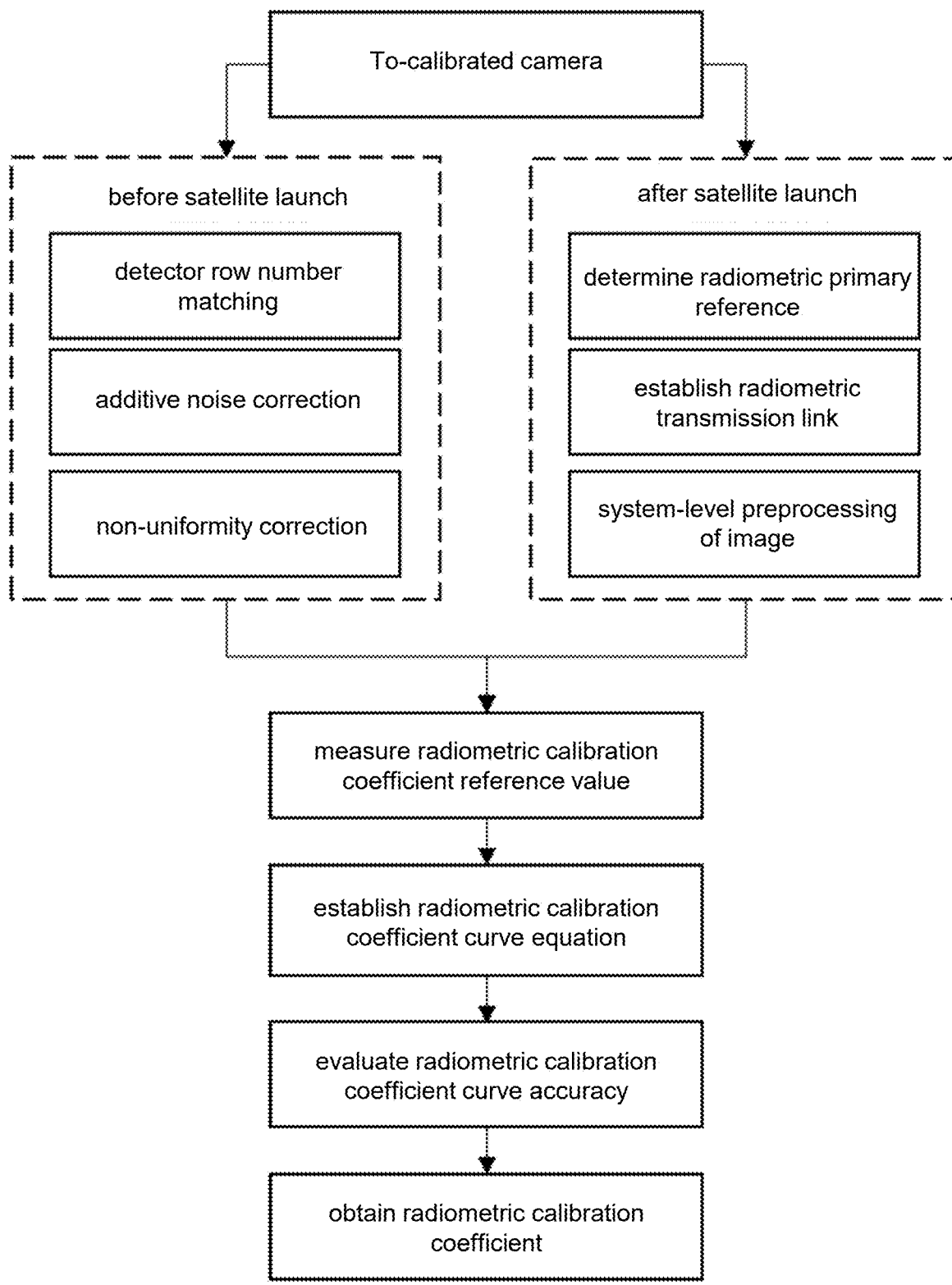
FIG. 2 is a flowchart 2 illustrating a curve-based radiometric calibration method of a spaceborne hyperspectral imager according to the present disclosure.

Specifically, as shown in FIG. 2, an embodiment of the present disclosure includes the following steps.

At step 1, before the to-be-calibrated hyperspectral imager with LVF is launched, the LVF is matched with the CMOS detector array, and a central wavelength $\lambda_c(j)$ corresponding to an imaging device position is calculated, namely, a row number j of the CMOS detector array is calculated; and an one-to-one correspondence $\lambda_c(j)=g \times j + w_0$ between row number on the spectral axis of the camera and central wavelength is established, where g is a wavelength change gradient of the LVF, and $w_0$ is a wavelength corresponding to a start mechanical position of the LVF.

At step 2, before the to-be-calibrated hyperspectral camera with LVF is launched, in the laboratory dark background environment, no-reference radiation source imaging and calibration light source imaging of the to-be-calibrated hyperspectral camera are performed, and imaging data is analyzed and processed to eliminate the additive noises such as a dark current of each detector picture element; and non-uniformity correction between the rows of the CMOS detector array is completed.

At step 3, based on the calibration images collected in the step 1 and the measured spectral radiance distribution output by the calibration light source, a radiometric calibration equation $L_\lambda = f(DN)$ of a corresponding band is obtained by changing a radiance level of the ground calibration light source, where $L_\lambda$ is a spectral radiance distribution output by an integrating sphere, DN is a response signal of a camera, namely, an image gray value, and f is a function expression of the radiance calibration equation. After relative radiometric correction and additive noise elimination, it can be expressed as $L_\lambda = G_\lambda \cdot DN$, where $G_\lambda$ is a radiometric calibration coefficient reference value. By the formula, a radiometric calibration coefficient of several conventional spectral channels is calculated.

At step 4, based on the one-to-one correspondence $\lambda_c(j) = g \times j + w_0$ between imaging device position and central wavelength matched in the step 2 and the radiometric calibration coefficient reference value $G_\lambda$ of the conventional spectral channels in the step 3, regression analysis is performed on multiple groups of data points to obtain a curve equation of radiometric calibration coefficient reference value $G_\lambda = F(j)$, where $G_\lambda$ is a radiometric calibration coefficient reference value, j is a detector array row number, and F is a radiometric calibration coefficient curve equation.

At step 5, after the hyperspectral camera is launched into orbit, based on geometrical conditions of satellite earth observation, by the radiometric calibration method such as field calibration and cross calibration, a radiometric transmission link transmitting a radiometric primary reference spectral radiance $L_0(\lambda)$ to the entrance pupil of the to-be-calibrated hyperspectral imager in a camera observation direction is established, and in combination with a spectral response function $R_\lambda$ of the hyperspectral imager for prelaunch laboratory spectral calibration measurement, an in-band weighted mean spectral radiance is calculated.

At step 6, with strict matching the constraints of spatial, spectral and temporal resolutions, system-level preprocessing of the to-be-calibrated hyperspectral imager is completed; a mean gray value $\langle L_\lambda \rangle$ of each band of representative pixel points is extracted; a relationship between sequence discrete observation value and $\langle L\lambda \rangle$ is established by least square fitting; solving of the radiometric calibration coefficient reference value $G_\lambda$ is completed with the formula $\langle \overline{L\lambda} \rangle = G\lambda \times \langle L_\lambda \rangle$, where $\langle \overline{L\lambda} \rangle$ is a weighted mean gray value corresponding to the band central wavelength $\lambda$, $\langle \overline{L\lambda} \rangle$ is a mean gray value of each band of representative pixel points corresponding to the band central wavelength $\lambda$, and $G_\lambda$ is a radiometric calibration coefficient reference value.

At step 7, fitting is performed on the data points of the radiometric calibration coefficient reference value by fitting algorithm to obtain a global radiometric calibration curve; evaluation is performed on the radiometric calibration coefficient curve accuracy; on-orbit radiometric calibration curve equation $G_\lambda = F(j)$ is established; based on imaging row number, a curve value is calculated as an imaging band radiometric calibration coefficient to match the implementation of the programmable band selection imaging technology.

At step 8, based on the function mapping relationship in the step 6, periodic measurement is performed on the reference value of the radiometric calibration coefficient curve fitting; based on the radiometric calibration curve equation in the step 7, the on-orbit attenuated radiometric calibration curve is updated to obtain the imaging band radiometric calibration coefficient.

In the present disclosure, the radiometric calibration coefficient is used to cover the entire imaging spectral range of the hyperspectral camera and match the implementation of the programmable band selection imaging technology, realizing on-orbit absolute radiometric calibration with simple flow and strong universality, greatly reducing the satellite resources required for the on-orbit radiometric calibration of the spaceborne hyperspectral imager with LVF, and thus providing important reference for normalized and periodic on-orbit radiometric calibration.

On the basis of the above embodiment, the step 100 includes matching of the CMOS detector row number:

At step 1.1, before the to-be-calibrated hyperspectral camera with LVF is launched, the linear variable filter is matched with the CMOS detector array, and a central wavelength $\lambda_c(j)$ corresponding to an imaging device position is calculated, namely, a row number j of the CMOS detector array is calculated; and an one-to-one correspondence between row number on the spectral axis of the camera and central wavelength is established.

At step 1.2, with a monochromator as a wavelength-continuously-adjustable light source irradiating the to-be-calibrated hyperspectral imager through a collimator, the monochromator, with a minimum step distance, repetitively outputs actual stepping corresponding to each standard wavelength by starting from a start wavelength of the to-be-calibrated hyperspectral imager, and collects calibration images of different wavelengths output by the to-be-calibrated hyperspectral imager until an ending wavelength of the to-be-calibrated hyperspectral imager is reached.

At step 1.3, a mean gray value of an image with a central wavelength of $\lambda c$ is calculated row-by-row, and the mean gray values are compared such that a row with a maximum mean gray value is used as a corresponding output row j of the central wavelength $\lambda e$.

At step 1.4, the step 1.3 is repeated within an imaging spectral range to obtain corresponding output rows of different central wavelengths, and each central wavelength and a row number corresponding to the maximum on the corresponding calibration image are determined.

Figure 3:
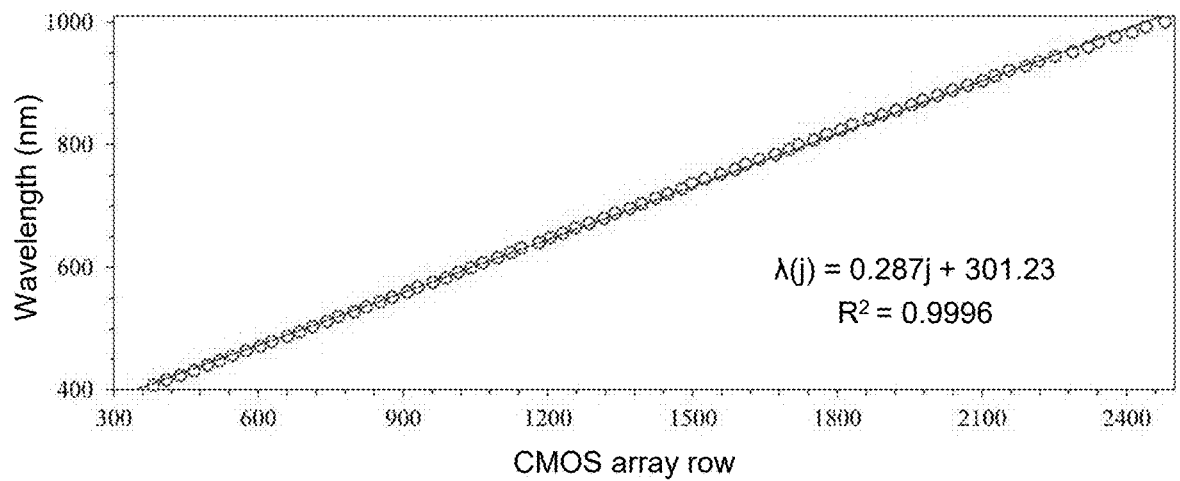
FIG. 3 is an exemplary diagram illustrating a function mapping relationship between detector row number and central wavelength according to the present disclosure.

At step 1.5, based on least square method, an one-to-one correspondence $\lambda_c(j)=g \times j+w_0$ between row number on the spectral axis of the camera and central wavelength is established, where g is a wavelength change gradient of the LVF, and $w_0$ is a wavelength corresponding to a start mechanical position of the LVF. With a hyperspectral imager as example, the matching result of the detector row number fitted by the method of the present disclosure is as shown in FIG. 3 and a function mapping relationship between detector row number and central wavelength is obtained.

On the basis of the above embodiment, the step 200 includes additive noise elimination and non-uniformity correction:

At step 2.1, in order to realize pushbroom imaging of the hyperspectral imager with LVF, it is necessary to ensure the picture element uniformity in a direction perpendicular to a change gradient direction of the central wavelength. Furthermore, because the additive noise is irrelevant to optical signal strength, it is necessary to eliminate additive noise.

At step 2.2, the to-be-calibrated hyperspectral imager is enabled to work in a dark background imaging mode to collect dark background image data at least 50 times for eliminating background noise generated by the hyperspectral imager due to dark current.

At step 2.3, the to-be-calibrated hyperspectral imager is set to default imaging parameters, and the to-be-calibrated hyperspectral imager is irradiated by the integrating sphere to collect valid image data at least 50 times and a spectral radiance distribution of the integrating sphere is measured with a spectroradiometer.

At step 2.4, the spectral radiance distribution of the integrating sphere is continuously and uniformly changed several times and the step 2.3 is repeated.

At step 2.5, based on the collected calibration images and the measured spectral radiance distribution output by the integrating sphere, a relative radiometric calibration coefficient and a relative response non-linearity of the to-be-calibrated hyperspectral imager are calculated in the following formula:

$$\overline{DN_{i,k}} - \overline{DN_{i,0}} = (DN_{i,j,k} - DN_{i,j,0}) * a_{i,j} + b_{i,j}$$

where $\overline{DN_{i,k}}$ is an output signal mean value of the i-th row of valid detector elements under the k-th-level radiance, $\overline{DN_{i,0}}$ is an output signal mean value of the i-th row of valid detector elements at the time of no-reference radiation source, $DN_{i,j,k}$ is an output signal mean value of the picture element of the i-th row and the j-th column under the k-th-level radiance, $DN_{i,j,0}$ is an output signal of the picture element of the i-th row and the j-th column at the time of no-reference radiation source, $a_{i,j}, b_{i,j}$ are a relative radiometric calibration coefficient and a relative radiometric calibration constant of the j-th detector element of the i-th band. The above equation set is solved by least square method.

On the basis of the above embodiment, the step 300 includes measuring the prelaunch radiometric calibration coefficient reference value:

At step 3.1, based on the calibration images collected in the step 2 and the measured spectral radiance distribution output by the integrating sphere, an absolute radiometric calibration coefficient of each spectral channel is calculated, and an equivalent radiance of the to-be-calibrated hyperspectral camera corresponding to the spectral radiance output by the integrating sphere is calculated in the following formula:

$$L_e = \frac{\int_{\lambda_{min}}^{\lambda_{max}} L_\lambda R_\lambda d\lambda}{\int_{\lambda_{min}}^{\lambda_{max}} R_\lambda d\lambda}$$

where $L_e$ is an equivalent radiance of a current spectral channel, $R_\lambda$ is a relative spectral response function of the current spectral channel, $\lambda_{min}$ is a minimum wavelength of the relative spectral response function, $\lambda_{max}$ is a maximum wavelength of the relative spectral response function, and $L_\lambda$ is a spectral radiance distribution output by the integrating sphere.

At step 3.2, an output row j corresponding to the central wavelength $\lambda_c$ of the current spectral channel is selected on the current calibration image, and a mean gray value $\langle L_j \rangle$ of all pixels on the row j is calculated.

At step 3.3, the calibration images corresponding to different spectral radiance distributions are selected to repeat the step 3.2 so as to obtain corresponding mean gray values; through relative radiometric correction and additive noise elimination, the formula $L_\lambda = G_\lambda \cdot \langle L_j \rangle$ can be obtained, where $L_\lambda$ is a spectral radiance distribution output by the integrating sphere, $\langle L_j \rangle$ is a mean gray value of all pixels on the j-th row of a camera detector, and $G_\lambda$ is a radiometric calibration coefficient reference value; by least square fitting, the radiometric calibration coefficient of the spectral channels is calculated.

At step 3.4, the calibration images of different spectral channels are selected to repeat the step 3.3 so as to obtain the radiometric calibration coefficients of several conventional spectral channels as the radiometric calibration coefficient reference value.

On the basis of the above embodiment, the step 400 includes establishing the prelaunch radiometric calibration coefficient curve equation:

At step 4.1, based on the one-to-one correspondence $\lambda_c(j) = g \times j + w_0$ between imaging device position and central wavelength matched in the step 2 and the radiometric calibration coefficient reference value $G_\lambda$ in the step 3, regression analysis is performed on multiple groups of data points to obtain a curve equation of radiometric calibration coefficient reference value $G_\lambda = F(j)$, where $G_\lambda$ is a radiometric calibration coefficient reference value, j is a detector array row number, and F is a radiometric calibration coefficient curve equation.

At step 4.2, $$R^2 = 1 - \frac{\sum_{\lambda=1}^{n}(M_\lambda - F_\lambda)^2}{\sum_{\lambda=1}^{n}(M_\lambda - \overline{M})^2}$$

is determined as the curve accuracy evaluation formula, where $F_\lambda$ is a fitting value with the band central wavelength being $\lambda$, $M_\lambda$ is a measurement reference value with the band central wavelength being $\lambda$, n is a total wavelength number, $R^2$ is a determination coefficient, and $\overline{M}$ is a measurement reference mean value with the band central wavelength being A.

At step 4.3, based on the accuracy evaluation result, a polynomial function is used as the radiometric calibration coefficient curve equation shown below:

$$G_\lambda = p_1 \lambda_j^n + p_2 \lambda_j^{n-1} + \ldots + p_n \lambda_j + p_{n+1}$$

where n is a degree of a polynomial, namely, a total wavelength number, and $p_1, p_2 \ldots, p_{n+1}$ are coefficients of the degrees of the corresponding items of the polynomial.

On the basis of the above embodiment, the step 500 includes establishing the radiometric reference transmission link:

At step 5.1, integration is performed on the reference radiometric data $\rho_{TOA}(\lambda)$ by spectral integration formula, so as to obtain a mean TOA reflectance $\langle \rho_{TOA}(\lambda) \rangle$ of the position corresponding to the central wavelength $\lambda$ of the hyperspectral imager, with the integration formula as below:

$$\langle \rho_{TOA}(\lambda) \rangle = \frac{\int_{\lambda \in B} \rho_{TOA}(\lambda) S_B(\lambda) d\lambda}{\int_{\lambda \in B} S_B(\lambda) d\lambda}$$

where $\langle \rho_{TOA}(\lambda) \rangle$ is a mean TOA reflectance corresponding to the central wavelength $\lambda$ of the to-be-determined hyperspectral imager, $\rho_{TOA}(\lambda)$ is reference TOA reflectance data, and B and $S_B$ are a spectral range and a spectral response function of the to-be-determined hyperspectral imager respectively.

At step 5.2, based on geometrical conditions of earth observation, the equivalent radiance $\overline{DN_\lambda}$ of each spectral band at the entrance pupil of the to-be-determined hyperspectral imager is obtained, and a radiometric reference transmission link equation is shown below:

$$\overline{DN_\lambda} = \frac{\langle \rho_{TOA}(\lambda) \rangle \times E_{sun}(\lambda) \times \cos(\theta_{SAT})}{\pi \times D_{SE}^2}$$

where $\overline{DN_\lambda}$ is an equivalent radiance of each spectral band at the entrance pupil of the to-be-determined hyperspectral imager, which is in the unit of w/(m² sr μm); $\langle \rho_{TOA}(\lambda) \rangle$ is a mean TOA reflectance corresponding to the central wavelength $\lambda$ of the to-be-determined hyperspectral imager, which has no unit dimension; $D_{SE}$ is an earth-sun distance represented by astronomical unit (AU); $E_{sun}(\lambda)$ is a solar spectral irradiance of a position corresponding to the central wavelength $\lambda$ of the to-be-determined hyperspectral imager at the time of satellite imaging; and $\theta_{SAT}$ is a solar zenith angle at the time of satellite imaging.

A mean solar irradiance $E_{sun}(\lambda)$ of each band is calculated by integrating the spectral response function of the hyperspectral imager using Chance-Kurucz (ChKur) model, and minute-interval cubic spline interpolation sampling is performed on the solar zenith angle assistance data, and $\theta_{SAT}$ is a solar zenith angle within a minute most adjacent to the satellite imaging time.

On the basis of the above embodiment, the step 600 includes measuring on-orbit radiometric calibration coefficient reference value:

At step 6.1, the mean gray value $\langle L_\lambda \rangle$ of each band of representative pixel points is calculated in the formula below:

$$\langle L_\lambda \rangle = \frac{\langle L_\lambda \rangle_{total}}{MN}$$

where M and N are a row and a column of representative pixels respectively, with the total number being MN; $\langle L_\lambda \rangle_{total}$ is a total gray value of each band $\lambda$ obtained by traversing representative picture elements of each band, and $\langle L_\lambda \rangle$ is a mean gray value of each band of representative pixel points.

At step 6.2, with the strict matching the constraints of spatial, spectral and temporal resolutions, a relationship between sequence discrete observation value and $\langle L_\lambda \rangle$ is established by least square fitting; solving of the radiometric calibration coefficient reference value $G_\lambda$ is completed, with the calculation formula:

$$\langle \overline{L\lambda} \rangle = G_\lambda \times \langle L_\lambda \rangle$$

where $\langle \overline{L\lambda} \rangle$ is a weighted mean gray value corresponding to the band central wavelength $\lambda$, $\langle L_\lambda \rangle$ is a mean gray value of each band of representative pixel points corresponding to the band central wavelength $\lambda$, and $G_\lambda$ is a radiometric calibration coefficient reference value.

On the basis of the above embodiment, the step 700 includes establishing the postlaunch radiometric calibration coefficient curve equation:

At step 7.1, based on the accuracy evaluation result in the step 4, a cubic polynomial function is used as the radiometric calibration coefficient curve equation $G_\lambda=p_1\lambda_j^3+p_2\lambda_j^2+p_3\lambda_j+p_4$, where $G_\lambda$ is a radiometric calibration coefficient reference value corresponding to the imaging spectral band, j is a detector array row number, and $p_1,p_2,p_3,p_4$ are coefficients of the degrees of the corresponding items of the polynomial.

Figure 4:
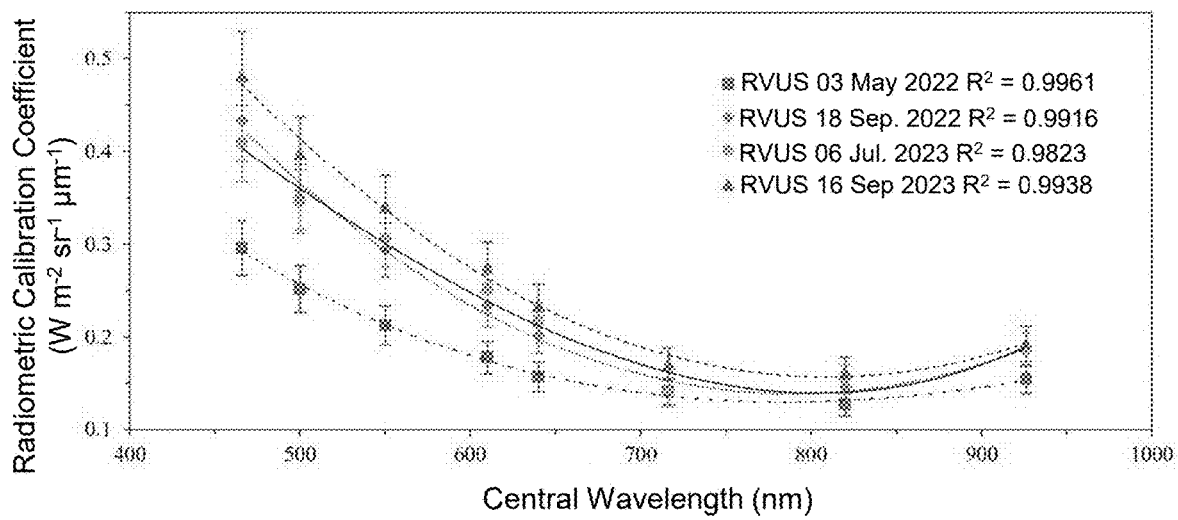
FIG. 4 is a schematic diagram illustrating an on-orbit radiometric calibration coefficient curve according to the present disclosure.

At step 7.2, the coefficient of each item is calculated by the least square method, and the radiometric calibration curve equation is solved. FIG. 4 is a schematic diagram illustrating an exemplary on-orbit radiometric calibration curve of the hyperspectral camera.

At step 7.3, the root-mean-square error $$RMSE = \sqrt{\frac{1}{n}\sum_{j=1}^{n}(M_\lambda-F_\lambda)^2}$$

is used as curve accuracy evaluation formula, where $F_\lambda$ is a fitting value of the band central wavelength λ, $M_\lambda$ is a measurement reference value of the band central wavelength λ, n is a total wavelength number and j is a detector array row number.

On the basis of the above embodiment, the step 800 includes updating the on-orbit attenuated radiometric calibration curve:

Based on the one-to-one correspondence $\lambda_c(j)=g\times j+w_0$ between imaging device position and central wavelength matched in the step 2 and the radiometric calibration coefficient curve equation in the step 7, periodic calculation is performed on the radiometric calibration coefficient reference value of the step 6 to normally update the on-orbit attenuated radiometric calibration coefficient curve of the instrument.

The present disclosure creatively introduces, based on the theoretical basis of linear change of the spectral properties of the LVF along with mechanical position, a new radiometric calibration coefficient curve to describe radiometric properties of the sensor response as periodic on-orbit radiometric calibration observation parameters of the hyperspectral imager with LVF. Based on the conventional absolute radiometric calibration, the curve-based radiometric calibration method is proposed, which ensures the radiometric calibration coefficient covers the entire imaging spectral range and matches the implementation of the programmable band selection imaging technology, providing good universality and simple flow to be easily implemented on orbit.

The curve-based radiometric calibration system of the spaceborne hyperspectral imager provided by the present disclosure will be described below. The curve-based radiometric calibration system of the spaceborne hyperspectral imager described below can be referred correspondingly to the descriptions of the curve-based radiometric calibration method of the spaceborne hyperspectral imager described above.

Figure 5:
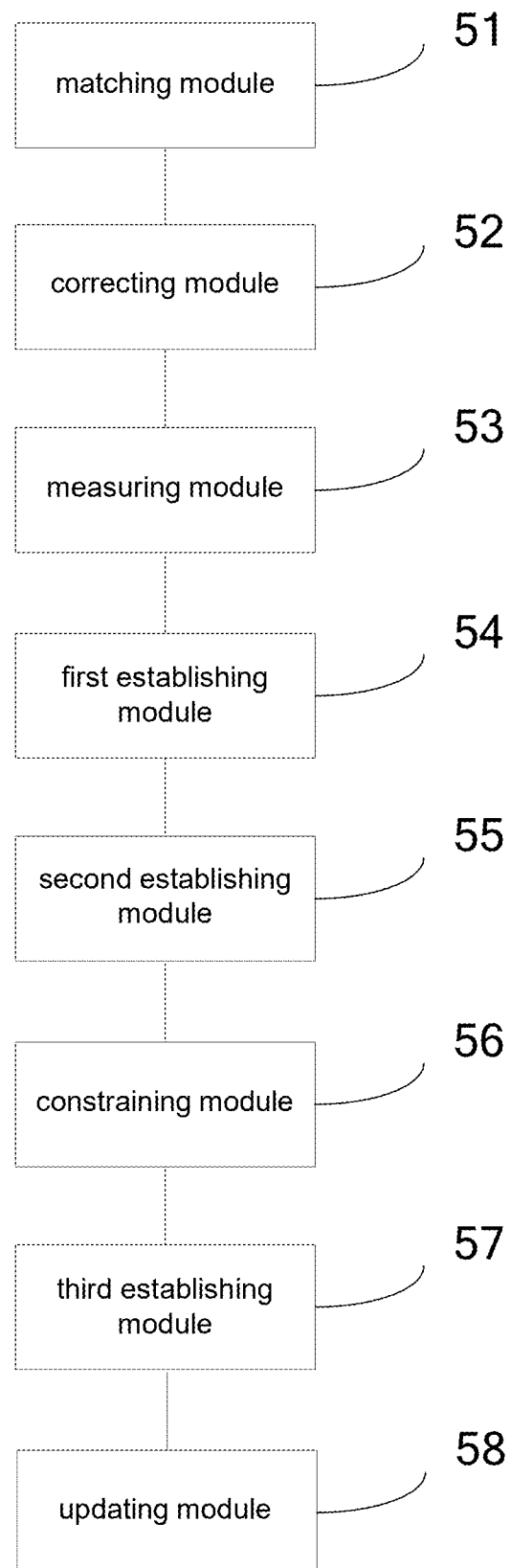
FIG. 5 is a structural schematic diagram illustrating a curve-based radiometric calibration system of a spaceborne hyperspectral imager according to the present disclosure.

FIG. 5 is a structural schematic diagram illustrating a curve-based radiometric calibration system of a spaceborne hyperspectral imager according to the present disclosure. As shown in FIG. 5, the system includes a matching module 51, a correcting module 52, a measuring module 53, a first establishing module 54, a second establishing module 55, a constraining module 56, a third establishing module 57 and an updating module 58.

The matching module 51 is configured to, before a to-be-determined hyperspectral imager is launched, match a LVF with a CMOS detector array to acquire a matching result of a CMOS detector row number; the correcting module 52 is configured to, in a laboratory dark background environment, perform no-reference radiation source imaging and calibration light source imaging of the to-be-determined hyperspectral imager, and complete additive noise correction and non-uniformity correction of the CMOS detector; the measuring module 53 is configured to, based on the calibration source light imaging and measured spectral radiance distribution, measure a radiometric calibration coefficient reference value of several conventional spectral channels; the first establishing module 54 is configured to, based on the radiometric calibration coefficient reference value, establish a prelaunch radiometric calibration coefficient curve equation and determine a radiometric calibration curve accuracy evaluation result; the second establishing module 55 is configured to, after the to-be-determined hyperspectral imager is launched, establish a radiometric reference transmission link; the constraining module 56 is configured to, with the constraints of spatial, spectral and temporal resolutions, complete system-level preprocessing of the to-be-determined hyperspectral imager and measure the radiometric calibration coefficient reference value of the to-be-determined hyperspectral imager on orbit; the third establishing module 57 is configured to, based on the radiometric calibration curve accuracy evaluation result, perform fitting on data points of the radiometric calibration coefficient reference value by fitting and establish a postlaunch radiometric calibration coefficient curve equation; the updating module 58 is configured to, based on the postlaunch radiometric calibration coefficient curve equation, perform periodic calculation on the radiometric calibration coefficient reference value of the to-be-determined hyperspectral imager on orbit to obtain an updated on-orbit attenuated radiometric calibration curve, and obtain an imaging band radiometric calibration coefficient based on the updated on-orbit attenuated radiometric calibration curve.

Figure 6:
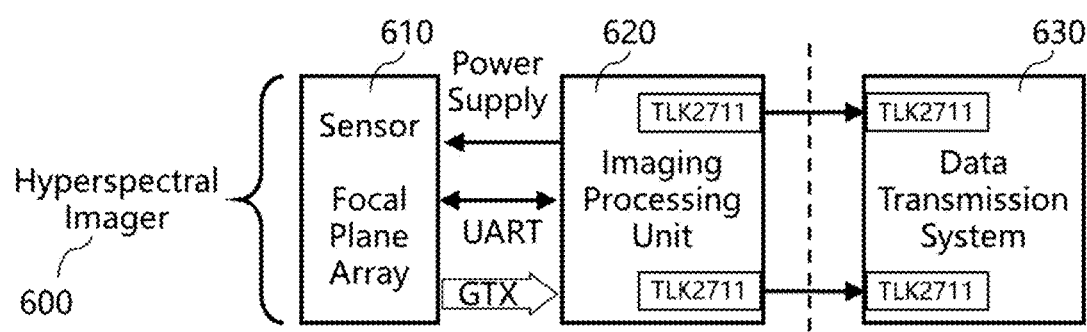
FIG. 6 is a structural schematic diagram illustrating an electronic device according to the present disclosure.

FIG. 6 illustrates a schematic diagram of the physical structure of an electronic device. As shown in FIG. 6, the electronic device comprises a Hyperspectral Imager 600 a Focal Plane Array (FPA) 610, an Imaging Processor Unit (IPU) 620, and a Data Transmission System 630. In this system architecture, the complete hyperspectral camera imaging processing unit consists of one focal plane array 610 and one imaging processor unit 620. Each imaging processing unit communicates with the data transmission system 630 via two TLK2711 high-speed transceivers, supporting 2.5 Gbps high-speed serial data transmission to ensure efficient construction and real-time transmission of hyperspectral image data cubes. Furthermore, the system incorporates an FPGA (Field-Programmable Gate Array) specifically designed for hyperspectral band selection imaging, enabling rapid parsing and reading of designated imaging bands. This facilitates the implementation of the curve-based radiometric calibration method, thereby enhancing the accuracy and stability of on-orbit radiometric calibration. The method includes: before a to-be-determined hyperspectral imager is launched, matching a LVF with a CMOS detector array to acquire a matching result of a CMOS detector row number; in a laboratory dark background environment, performing no-reference radiation source imaging and calibration light source imaging of the to-be-determined hyperspectral imager, and completing additive noise correction and non-uniformity correction of the CMOS detector; based on the calibration source light imaging and measured spectral radiance distribution, measuring a radiometric calibration coefficient reference value of several conventional spectral channels; based on the radiometric calibration coefficient reference value, establishing a prelaunch radiometric calibration coefficient curve equation and determining a radiometric calibration curve accuracy evaluation result; after the to-be-determined hyperspectral imager is launched, establishing a radiometric reference transmission link; with the constraints of spatial, spectral and temporal resolutions, completing system-level preprocessing of the to-be-determined hyperspectral imager and measuring the radiometric calibration coefficient reference value of the to-be-determined hyperspectral imager on orbit; based on the radiometric calibration curve accuracy evaluation result, performing fitting on data points of the radiometric calibration coefficient reference value by fitting and establishing a postlaunch radiometric calibration coefficient curve equation; based on the postlaunch radiometric calibration coefficient curve equation, performing periodic calculation on the radiometric calibration coefficient reference value of the to-be-determined hyperspectral imager on orbit to obtain an updated on-orbit attenuated radiometric calibration curve, and obtaining an imaging band radiometric calibration coefficient based on the updated on-orbit attenuated radiometric calibration curve.

The logical instructions in the above memory 630, if implemented in the form of software functional units and sold or used as independent products, may be stored in a computer-readable storage medium. Based on such understanding, the technical scheme of the present disclosure essentially or a part contributing to the prior art or part of the technical scheme may be embodied in the form of a software product, the software product is stored in a storage medium, and includes several instructions for enabling a computer device (such as a personal computer, a server or a network device) to execute all or part of the steps of the method disclosed by the embodiments of the present disclosure; and the above storage mediums include various mediums such as a USB flash drive, a removable hard disk, a read-only memory (ROM), a random access memory (RAM), a diskette or a compact disk and the like which may store program codes.

Figure 7:
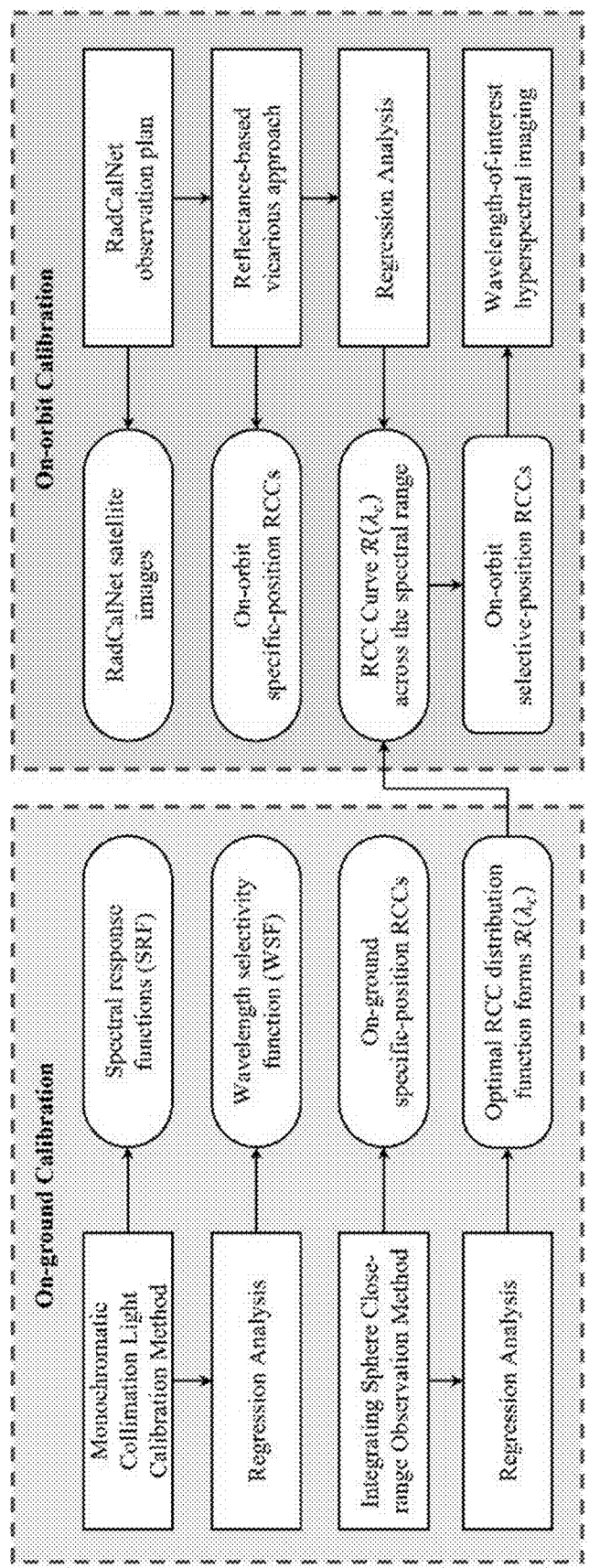
FIG. 7 is a flowchart illustrating the implementation for microsatellite on-orbit periodic calibration using proposed Curve-based Hyperspectral Imager Radiometric Calibration (CHIRON) method.

FIG. 7 is a flowchart illustrating the implementation for microsatellite on-orbit periodic calibration using proposed Curve-based Hyperspectral Imager Radiometric Calibration (CHIRON) method. As shown in FIG. 7, a practical workflow that has been implemented for Compact Continuous Tunable LVF-based Hyperspectral Imager (CCTF-HI) on board QMX-1 microsatellite based on proposed CHIRON method. An overview of the workflow that can be implemented for microsatellite on-orbit periodic calibration using proposed Curve-based Hyperspectral Imager Radiometric Calibration (CHIRON) method.

Example: FIGS. 8A to 8D are schematic diagrams illustrating the geographic location and spatial distribution of four RadCalNet sites and their spatial sampling for on-orbit radiometric calibration of QMX-1/CCTF-HI. As shown in FIGS. 8A to 8D, the QMX-1 microsatellite was operational from March 2022 to January 2024. Given the 22-day revisit periods, monthly imaging missions were scheduled, targeting four RadCalNet sites under optimal atmospheric conditions. The geographic location and spatial distribution of four RadCalNet sites and their spatial sampling for on orbit radiometric calibration of QMX-1/CCTF-HI. FIG. 8A: RVUS site. FIG. 8B: BSCN site. FIG. 8C: GONA site. FIG. 8D: LCFR site. The base map is the quasi-true color georeferenced QMX-1/CCTF-HI image.

FIG. 9A to FIG. 9L are schematic diagrams comparing the bottom-of-atmosphere reflectance measurements of QMX-1/CCTF-HI and Zhuhai-1/OHS3B satellites. As shown in FIG. 9A to FIG. 9L, the comparison of bottom-of-atmosphere (BOA) reflectance measurement. FIGS. 9A, 9C, 9E, 9G, 9I, 9K: the spatial sampling (frame). The basemaps of terrestrial features is the monthly mosaics from PlanetScope in 2023 November. FIGS. 9B, 9D, 9F, 9H, 9J, 9L: the spectral sampling. The BOA reflectance of the spectral curves captured from QMX-1/CCTF-HI and Zhuhai-1/OHS3B satellites, exhibiting the accuracy under 30% spatial sampling consistency.

The apparatus embodiments described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the embodiments. Those skilled in the arts can understand and practice them without carrying out creative work.

It may be known from descriptions of the above embodiments that persons skilled in the art may clearly understand that the embodiments of the present disclosure may be implemented by means of software and a necessary general hardware platform or by hardware. Based on such understanding, the technical solutions of embodiments of the present disclosure essentially or a part contributing to the prior art may be embodied in the form of a software product, and the computer software product may be stored in a computer readable storage medium, such as a ROM/RAM, a diskette or a compact disk, and includes several instructions for enabling a computer device (such as a personal computer, a server or a network device) to perform the methods of different embodiments or some parts of the embodiments of the present disclosure.

Finally, it should be noted that the above embodiments are only used to describe the technical solutions of the present disclosure rather than limit the present disclosure. Although detailed descriptions are made to the present disclosure by referring to the preceding embodiments, those skilled in the art should understand that they can still make modifications to the technical solutions recorded in the above embodiments or make equivalent substitutions to part of technical features therein within the technical scope of the present disclosure. Such modifications, changes and substitutions will not cause the essence of the corresponding technical solutions to depart from the spirit and scope of the technical solutions of the embodiments of the present disclosure.

What is claimed is:

1. A curve-based radiometric calibration method of a spaceborne hyperspectral imager, comprising:
    before a to-be-determined hyperspectral imager is launched, matching a linear variable filter with a Complementary Metal Oxide Semiconductor (CMOS) detector array to acquire a matching result of a CMOS detector row number;
    in a laboratory dark background environment, performing no-reference radiation source imaging and calibration light source imaging of the to-be-determined hyperspectral imager, and completing additive noise correction and non-uniformity correction of the CMOS detector;
    based on the calibration source light imaging and measured spectral radiance distribution, measuring a radiometric calibration coefficient reference value of several conventional spectral channels;

based on the radiometric calibration coefficient reference value, establishing a prelaunch radiometric calibration coefficient curve equation and determining a radiometric calibration curve accuracy evaluation result;

after the to-be-determined hyperspectral imager is launched, establishing a radiometric reference transmission link;

with constraints of spatial, spectral and temporal resolutions, completing system-level preprocessing of the to-be-determined hyperspectral imager and measuring a radiometric calibration coefficient reference value of the to-be-determined hyperspectral imager on orbit;

based on the radiometric calibration curve accuracy evaluation result, performing fitting on data points of the radiometric calibration coefficient reference value by using a fitting algorithm and establishing a postlaunch radiometric calibration coefficient curve equation;

based on the postlaunch radiometric calibration coefficient curve equation, performing periodic calculation on the radiometric calibration coefficient reference value of the to-be-determined hyperspectral imager on orbit to obtain an updated on-orbit attenuated radiometric calibration curve, and obtaining an imaging band radiometric calibration coefficient based on the updated on-orbit attenuated radiometric calibration curve.

2. The curve-based radiometric calibration method of the spaceborne hyperspectral imager according to claim 1, wherein before the to-be-determined hyperspectral imager is launched, matching the linear variable filter with the CMOS detector array to acquire the matching result of the CMOS detector row number comprises the following steps:

at step 1.1, with a monochromator as a wavelength-continuously-adjustable light source irradiating the to-be-determined hyperspectral imager through a collimator, the monochromator, with a minimum step distance as a start of wavelength change, repetitively outputs actual stepping corresponding to each standard wavelength by starting from a start wavelength of the to-be-determined hyperspectral imager, and collects calibration images of different wavelengths output by the to-be-determined hyperspectral imager until an ending wavelength of the to-be-determined hyperspectral imager is reached;

at step 1.2, a mean gray value of an image with a central wavelength of $\lambda_c$ is calculated row-by-row and a row with a maximum mean gray value is used as a corresponding output row j of the central wavelength $\lambda_c$;

at step 1.3, the step 1.2 is repeated within an imaging spectral range to obtain corresponding output rows of different central wavelengths, and each central wavelength and a row number corresponding to the maximum on the corresponding calibration image are determined;

at step 1.4, based on least square method, a linear relational expression $\lambda_c(j)=g \times j+w_0$ between CMOS detector row number and central wavelength is established, wherein g is a wavelength change gradient of the linear variable filter, and $w_0$ is a wavelength corresponding to a start mechanical position of the linear variable filter.

3. The curve-based radiometric calibration method of the spaceborne hyperspectral imager according to claim 1, wherein in the laboratory dark background environment, performing the no-reference radiation source imaging and the calibration the light source imaging of the to-be-determined hyperspectral imager, and completing the additive noise correction and the non-uniformity correction of the CMOS detector comprise the following steps:

at step 2.1, the to-be-determined hyperspectral imager is enabled to work in a dark background imaging mode to collect dark background image data several times;

at step 2.2, the to-be-determined hyperspectral imager is set to default imaging parameters, the to-be-determined hyperspectral imager is irradiated with an integrating sphere to collect valid image data several times, and a spectral radiance distribution of the integrating sphere is measured with a spectroradiometer;

at step 2.3, the spectral radiance distribution of the integrating sphere is continuously and uniformly changed several times and the step 2.2 is repeated;

at step 2.4, based on the collected calibration images and the spectral radiance distribution output by the integrating sphere, a relative radiometric calibration coefficient and a relative response non-linearity of the to-be-determined hyperspectral imager are calculated:

$$\overline{DN_{i,k}} - \overline{DN_{i,0}} = (DN_{i,j,k} - DN_{i,j,0}) * a_{i,j} + b_{i,j}$$

wherein $\overline{DN_{i,k}}$ is an output signal mean value of the i-th row of valid detector elements under the k-th-level radiance, $\overline{DN_{i,0}}$ is an output signal mean value of the i-th row of valid detector elements at the time of no-reference radiation source, $DN_{i,j,k}$ is an output signal mean value of the picture element of the i-th row and the j-th column under the k-th-level radiance, $DN_{i,j,0}$ is an output signal of the picture element of the i-th row and the j-th column at the time of no-reference radiation source, $a_{i,j}$, $b_{i,j}$ are a relative radiometric calibration coefficient and a relative radiometric calibration constant of the j-th detector element of the i-th band.

4. The curve-based radiometric calibration method of the spaceborne hyperspectral imager according to claim 1, wherein based on the calibration source light imaging and the measured spectral radiance distribution, measuring the radiometric calibration coefficient reference value of several conventional spectral channels comprises the following steps:

at step 3.1, based on the collected calibration images and the spectral radiance distribution output by the integrating sphere, an absolute radiometric calibration coefficient of each spectral channel is calculated, and the calculation of an equivalent radiance of the to-be-determined hyperspectral imager corresponding to the spectral radiance distribution output by the integrating sphere comprises:

$$L_e = \frac{\int_{\lambda_{min}}^{\lambda_{max}} L_\lambda R_\lambda d\lambda}{\int_{\lambda_{min}}^{\lambda_{max}} R_\lambda d\lambda}$$

wherein $L_e$ is an equivalent radiance of a current spectral channel, $R_\lambda$ is a relative spectral response function of the current spectral channel, $\lambda_{min}$ is a minimum wavelength of the relative spectral response function, $\lambda_{max}$ is a maximum wavelength of the relative spectral response function, and $L_\lambda$ is a spectral radiance distribution output by the integrating sphere;

at step 3.2, an output row j corresponding to the central wavelength $\lambda_c$ of the current spectral channel is selected on the current calibration image, and a mean gray value $\langle L_j \rangle$ of all pixels on the row j is calculated;

at step 3.3, the calibration images corresponding to different spectral radiance distributions are selected to repeat the step 3.2 so as to obtain corresponding mean gray values; through relative radiometric correction and additive noise elimination, the formula $L_\lambda = G_\lambda \cdot \langle L_j \rangle$ is obtained, wherein $L_\lambda$ is a spectral radiance distribution output by the integrating sphere, $\langle L_j \rangle$ is the mean gray value of all pixels on the j-th row of a camera detector, and $G_\lambda$ is a radiometric calibration coefficient reference value; by least square fitting, the radiometric calibration coefficient of any spectral channel is calculated;

at step 3.4, the calibration images of different spectral channels are selected to repeat the step 3.3 so as to obtain the radiometric calibration coefficients of several conventional spectral channels as the radiometric calibration coefficient reference values.

5. The curve-based radiometric calibration method of the spaceborne hyperspectral imager according to claim 1, wherein based on the radiometric calibration coefficient reference value, establishing the prelaunch radiometric calibration coefficient curve equation and determining the radiometric calibration curve accuracy evaluation result comprise the following steps:

at step 4.1, based on the linear relational expression $\lambda_c(j) = g \times j + w_0$ between CMOS detector row number and central wavelength and the radiometric calibration coefficient reference value $G_\lambda$, regression analysis is performed on multiple groups of data points to obtain a curve equation of radiometric calibration coefficient reference value $G_\lambda = F(j)$, wherein $G_\lambda$ is a radiometric calibration coefficient reference value, j is a detector array row number, and F is a radiometric calibration coefficient curve equation;

at step 4.2, $$R^2 = 1 - \frac{\sum_{\lambda=1}^{n}(M_\lambda - F_\lambda)^2}{\sum_{\lambda=1}^{n}(M_\lambda - \overline{M})^2}$$

is determined as the radiometric calibration curve accuracy evaluation result, wherein $F_\lambda$ is a fitting value with the band central wavelength being $\lambda$, $M_\lambda$ is a measurement reference value with the band central wavelength being $\lambda$, n is a total wavelength number, $R^2$ is a determination coefficient, and $\overline{M}$ is a measurement reference mean value with the band central wavelength being A;

at step 4.3, based on the radiometric calibration curve accuracy evaluation result, a polynomial function is used as the prelaunch radiometric calibration coefficient curve equation:

$$G_\lambda = p_1 \lambda_j^n + p_2 \lambda_j^{n-1} + \ldots + p_n \lambda_j + p_{n+1}$$

wherein n is a degree of a polynomial, namely, a total wavelength number, and $p_1, p_2, \ldots, p_{n+1}$ are coefficients of the degrees of the corresponding items of the polynomial.

6. The curve-based radiometric calibration method of the spaceborne hyperspectral imager according to claim 1, wherein after the to-be-determined hyperspectral imager is launched, establishing the radiometric reference transmission link comprises the following steps:

at step 5.1, integration is performed on reference Top-of-Atmosphere reflectance data $\rho_{TOA}(\lambda)$ based on spectral integration formula to obtain a mean Top-of-Atmosphere reflectance $\langle \rho_{TOA}(\lambda) \rangle$ corresponding to the central wavelength $\lambda$ of the to-be-determined hyperspectral imager:

$$\langle \rho_{TOA}(\lambda) \rangle = \frac{\int_{\lambda \in B} \rho_{TOA}(\lambda) S_B(\lambda) d\lambda}{\int_{\lambda \in B} S_B(\lambda) d\lambda}$$

wherein $\langle \rho_{TOA}(\lambda) \rangle$ is a mean Top-of-Atmosphere reflectance corresponding to the central wavelength $\lambda$ of the to-be-determined hyperspectral imager, $\rho_{TOA}(\lambda)$ is reference Top-of-Atmosphere reflectance data, and B and $S_B$ are a spectral range and a spectral response function of the to-be-determined hyperspectral imager respectively;

at step 5.2, based on geometrical conditions of earth observation, the equivalent radiance $\overline{DN_\lambda}$ of each spectral band at the entrance pupil of the to-be-determined hyperspectral imager is obtained, and a radiometric reference transmission link equation comprises:

$$\overline{DN_\lambda} = \frac{\langle \rho_{TOA}(\lambda) \rangle \times E_{sun}(\lambda) \times \cos(\theta_{SAT.})}{\pi \times D_{SE}^2}$$

wherein $\overline{DN_\lambda}$ is an equivalent radiance of each spectral band at the entrance pupil of the to-be-determined hyperspectral imager, which is in the unit of w/(m² sr μm); $\langle \rho_{TOA}(\lambda) \rangle$ is a mean Top-of-Atmosphere reflectance corresponding to the central wavelength $\lambda$ of the to-be-determined hyperspectral imager, which has no unit dimension; $D_{SE}$ is an earth-sun distance represented by astronomical unit (AU); $E_{sun}(\lambda)$ is a solar spectral irradiance of a position corresponding to the central wavelength $\lambda$ of the to-be-determined hyperspectral imager at the time of satellite imaging; and $\theta_{SAT.}$ is a solar zenith angle at the time of satellite imaging.

7. The curve-based radiometric calibration method of the spaceborne hyperspectral imager according to claim 1, wherein with the constraints of spatial, spectral and temporal resolutions, completing system-level preprocessing of the to-be-determined hyperspectral imager and measuring the radiometric calibration coefficient reference value of the to-be-determined hyperspectral imager on orbit comprise the following steps:

at step 6.1, the mean gray value $\langle L_\lambda \rangle$ of each band of representative pixel points is calculated:

$$\langle L_\lambda \rangle = \frac{\langle L_\lambda \rangle_{total}}{MN}$$

wherein M and N are a row and a column of representative pixels respectively, with the total number being MN; $\langle L_\lambda \rangle_{total}$ is a total gray value of each band $\lambda$ obtained by traversing representative picture elements of each band, and $\langle L_\lambda \rangle$ is a mean gray value of each band of representative pixel points;

at step 6.2, based on the constraints of spatial, spectral and temporal resolutions, the radiometric calibration coefficient reference value is obtained by least square fitting:

$$\langle\overline{L_j}\rangle = G_\lambda \times \langle L_\lambda \rangle$$

wherein $\langle L_\lambda \rangle$ is a weighted mean gray value corresponding to the band central wavelength $\lambda$, $\langle L_\lambda \rangle$ is a mean gray value of each band of representative pixel points corresponding to the band central wavelength $\lambda$, and $G_\lambda$ is a radiometric calibration coefficient reference value.

8. The curve-based radiometric calibration method of the spaceborne hyperspectral imager according to claim 1, wherein based on the radiometric calibration curve accuracy evaluation result, performing fitting on the data points of the radiometric calibration coefficient reference value by fitting and establishing the postlaunch radiometric calibration coefficient curve equation comprise the following steps:

at step 7.1, based on the radiometric calibration curve accuracy evaluation result, a cubic polynomial function is used as the postlaunch radiometric calibration coefficient curve equation:

$$G_\lambda = p_1\lambda_j^3 + p_2\lambda_j^2 + p_3\lambda_j + p_4$$

wherein $G_\lambda$ is a radiometric calibration coefficient reference value, j is a detector array row number, and $p_1, p_2, p_3, p_4$ are coefficients of the degrees of the corresponding items of the polynomial;

at step 7.2, the coefficient of each item of the postlaunch radiometric calibration coefficient curve equation is calculated by the least square method, and the postlaunch radiometric calibration coefficient curve equation is solved;

at step 7.3, the root-mean-square error $$RMSE = \sqrt{\frac{1}{n}\sum_{j=1}^{n}(M_\lambda - F_\lambda)^2}$$

is used as curve accuracy evaluation formula, wherein $F_\lambda$ is a fitting value of the band central wavelength $\lambda$, $M_\lambda$ is a measurement reference value of the band central wavelength $\lambda$, n is a total wavelength number and j is a detector array row number.

9. The curve-based radiometric calibration method of the spaceborne hyperspectral imager according to claim 1, wherein based on the postlaunch radiometric calibration coefficient curve equation, performing periodic calculation on the radiometric calibration coefficient reference value of the to-be-determined hyperspectral imager on orbit to obtain an updated on-orbit attenuated radiometric calibration curve comprises the following step:

based on the linear relational expression $\lambda_c(j) = g \times j + w_0$ between CMOS detector row number and central wavelength and the postlaunch radiometric calibration coefficient curve equation, periodic calculation is performed on the radiometric calibration coefficient reference value of the to-be-determined hyperspectral imager on orbit to obtain an updated on-orbit attenuated radiometric calibration curve.

10. A curve-based radiometric calibration system of a spaceborne hyperspectral imager, comprising:

a matching module, configured to, before a to-be-determined hyperspectral imager is launched, match a linear variable filter with a Complementary Metal Oxide Semiconductor (CMOS) detector array to acquire a matching result of a CMOS detector row number;

a correcting module, configured to, in a laboratory dark background environment, perform no-reference radiation source imaging and calibration light source imaging of the to-be-determined hyperspectral imager, and complete additive noise correction and non-uniformity correction of the CMOS detector;

a measuring module, configured to, based on the calibration source light imaging and measured spectral radiance distribution, measure a radiometric calibration coefficient reference value of several conventional spectral channels;

a first establishing module, configured to, based on the radiometric calibration coefficient reference value, establish a prelaunch radiometric calibration coefficient curve equation and determine a radiometric calibration curve accuracy evaluation result;

a second establishing module, configured to, after the to-be-determined hyperspectral imager is launched, establish a radiometric reference transmission link;

a constraining module, configured to, with constraints of spatial, spectral and temporal resolutions, complete system-level preprocessing of the to-be-determined hyperspectral imager and measure the radiometric calibration coefficient reference value of the to-be-determined hyperspectral imager on orbit;

a third establishing module, configured to, based on the radiometric calibration curve accuracy evaluation result, perform fitting on data points of the radiometric calibration coefficient reference value by fitting and establish a postlaunch radiometric calibration coefficient curve equation;

an updating module, configured to, based on the postlaunch radiometric calibration coefficient curve equation, perform periodic calculation on the radiometric calibration coefficient reference value of the to-be-determined hyperspectral imager on orbit to obtain an updated on-orbit attenuated radiometric calibration curve, and obtain an imaging band radiometric calibration coefficient based on the updated on-orbit attenuated radiometric calibration curve.

\* \* \* \* \*